United States Patent
Payne et al.

(10) Patent No.: US 11,526,518 B2
(45) Date of Patent: Dec. 13, 2022

(54) DATA REPORTING SYSTEM AND METHOD

(71) Applicant: Amazon Technologies, Inc., Seattle, WA (US)

(72) Inventors: John Payne, Seattle, WA (US); Yung Haw Wang, Seattle, WA (US); Mohan Rao Varthakavi, Sammamish, WA (US); Jose Kunnackal John, Redmond, WA (US); Santosh Kalki, Sammamish, WA (US); Mukul Vijay Karnik, Redmond, WA (US); Jared Scott Lundell, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 430 days.

(21) Appl. No.: 15/712,917

(22) Filed: Sep. 22, 2017

(65) Prior Publication Data

US 2019/0095499 A1 Mar. 28, 2019

(51) Int. Cl.
*G06F 16/20* (2019.01)
*G06F 16/2457* (2019.01)
*G06Q 30/00* (2012.01)
*G06Q 40/00* (2012.01)
*G06Q 10/10* (2012.01)

(52) U.S. Cl.
CPC ..... *G06F 16/24573* (2019.01); *G06Q 30/016* (2013.01); *G06Q 40/12* (2013.12); *G06Q 10/10* (2013.01)

(58) Field of Classification Search
None
See application file for complete search history.

(56) References Cited

U.S. PATENT DOCUMENTS

| | | |
|---|---|---|
| 6,430,531 B1 | 8/2002 | Polish |
| 8,719,038 B1 | 5/2014 | Gazdzinski |
| 9,367,608 B1 | 6/2016 | Zhang |
| 9,400,841 B2 | 7/2016 | Eggebraaten et al. |
| 9,865,280 B2 | 1/2018 | Sumner et al. |
| 9,946,747 B2 | 4/2018 | Barker et al. |
| 2002/0095411 A1 * | 7/2002 | Caldwell ............ G06Q 30/02 |

(Continued)

FOREIGN PATENT DOCUMENTS

| | | |
|---|---|---|
| WO | 9847083 A1 | 10/1998 |
| WO | 2016172642 A1 | 10/2016 |

OTHER PUBLICATIONS

"Cortana," Wikipedia, The Free Encyclopedia, Sep. 11, 2017, <https://en.wikipedia.org/wiki/Cortana> [retrieved Sep. 19, 2017], 9 pages.

(Continued)

*Primary Examiner* — Jau Shya Meng
(74) *Attorney, Agent, or Firm* — Davis Wright Tremaine LLP

(57) ABSTRACT

A data analysis system determines characteristics of a data set such as statistical measures, analytical insights, data trends, or relationships with other data sets. The system determines a level of importance for each determined characteristic using metadata associated with the data set, and, in some cases, user preferences provided by the user. Such metadata may include descriptive names, data types, and data characteristics of the data set and of data elements within the data set.

23 Claims, 15 Drawing Sheets

(56) References Cited

U.S. PATENT DOCUMENTS

| | | | |
|---|---|---|---|
| 2005/0004947 A1* | 1/2005 | Emlet | G06F 40/186 |
| 2008/0046757 A1* | 2/2008 | Staddon | H04L 9/088 |
| | | | 713/189 |
| 2010/0030552 A1* | 2/2010 | Chen | G06F 16/367 |
| | | | 704/9 |
| 2010/0057694 A1 | 3/2010 | Kunjithapatham et al. | |
| 2010/0235164 A1 | 9/2010 | Todhunter et al. | |
| 2011/0225159 A1* | 9/2011 | Murray | G06F 16/358 |
| | | | 707/739 |
| 2011/0295838 A1 | 12/2011 | Collins et al. | |
| 2012/0041969 A1* | 2/2012 | Priyadarshan | G06Q 30/02 |
| | | | 707/769 |
| 2012/0078899 A1* | 3/2012 | Fontana | G06F 16/78 |
| | | | 707/736 |
| 2012/0136649 A1 | 5/2012 | Freising et al. | |
| 2014/0006977 A1* | 1/2014 | Adams | H04L 12/1818 |
| | | | 715/758 |
| 2014/0195550 A1* | 7/2014 | Balakrishnan | G06F 16/64 |
| | | | 707/754 |
| 2014/0237062 A1* | 8/2014 | Abhyanker | H04L 67/30 |
| | | | 709/206 |
| 2015/0006539 A1* | 1/2015 | Sakamoto | G06F 16/907 |
| | | | 707/740 |
| 2015/0067553 A1* | 3/2015 | Grieve | G06F 3/0484 |
| | | | 715/765 |
| 2015/0095154 A1* | 4/2015 | Kannan | G06F 16/13 |
| | | | 705/14.55 |
| 2015/0112971 A1 | 4/2015 | Wolfram et al. | |
| 2015/0149454 A1* | 5/2015 | Hieronymus | G06F 16/24578 |
| | | | 707/728 |
| 2015/0179168 A1 | 6/2015 | Hakkani-Tur et al. | |
| 2015/0206525 A1 | 7/2015 | Ryder | |
| 2015/0338917 A1 | 11/2015 | Steiner et al. | |
| 2015/0379989 A1 | 12/2015 | Balasubramanian et al. | |
| 2015/0382047 A1 | 12/2015 | Van Os et al. | |
| 2016/0078019 A1 | 3/2016 | Napieralski et al. | |
| 2016/0103822 A1 | 4/2016 | George et al. | |
| 2016/0110415 A1 | 4/2016 | Clark et al. | |
| 2016/0132800 A1* | 5/2016 | Davar | G06Q 10/0637 |
| | | | 705/7.36 |
| 2016/0154884 A1* | 6/2016 | Belov | G06Q 50/01 |
| | | | 707/770 |
| 2016/0180217 A1 | 6/2016 | Boston et al. | |
| 2016/0180438 A1 | 6/2016 | Boston et al. | |
| 2016/0247068 A1 | 8/2016 | Lin | |
| 2016/0260433 A1 | 9/2016 | Sumner et al. | |
| 2016/0314146 A1* | 10/2016 | Carothers | G06F 16/38 |
| 2016/0378747 A1 | 12/2016 | Orr et al. | |
| 2017/0060823 A1* | 3/2017 | Zheng | G06F 16/248 |
| 2017/0075988 A1 | 3/2017 | Kadiri et al. | |
| 2017/0084295 A1 | 3/2017 | Tsiartas et al. | |
| 2017/0177660 A1 | 6/2017 | Chang et al. | |
| 2017/0230709 A1 | 8/2017 | Van Os et al. | |
| 2017/0263249 A1* | 9/2017 | Akbacak | G10L 15/08 |
| 2017/0316085 A1 | 11/2017 | Gupta et al. | |
| 2017/0329848 A1 | 11/2017 | Goodman et al. | |
| 2017/0358302 A1 | 12/2017 | Orr et al. | |
| 2018/0027123 A1 | 1/2018 | Cartwright et al. | |
| 2018/0032576 A1 | 2/2018 | Romero | |
| 2018/0032612 A1 | 2/2018 | Kariman | |
| 2018/0033332 A1 | 2/2018 | Nelson | |
| 2018/0082197 A1 | 3/2018 | Aravamudan et al. | |
| 2018/0133900 A1 | 5/2018 | Breazeal et al. | |
| 2018/0144064 A1 | 5/2018 | Krasadakis | |
| 2018/0210883 A1 | 7/2018 | Ang | |
| 2019/0042572 A1 | 2/2019 | Moreno et al. | |

OTHER PUBLICATIONS

"Google Home," Wikipedia, The Free Encyclopedia, Aug. 31, 2017, <https://en.wikipedia.org/wiki/Google_Home> [retrieved Sep. 19, 2017], 8 pages.

"Natural Language Processing," Wikipedia, The Free Encyclopedia, Sep. 14, 2017, <https://en.wikipedia.org/wiki/Natural_language_processing> [retrieved Sep. 19, 2017], 9 pages.

"Wolfram Alpha," Wikipedia, The Free Encyclopedia, Sep. 19, 2017, <https://en.wikipedia.org/wiki/Wolfram_Alpha> [retrieved Sep. 19, 2017], 6 pages.

Banaee et al., "A Framework for Automatic Text Generation of Trends in Physiological Time Series Data," 2013 IEEE International Conference on Systems, Man, and Cybernetics, Oct. 13, 2013, pp. 3876-3881.

International Search Report and Written Opinion, dated Nov. 26, 2018, International Patent Application PCT/US2018/52288, filed Sep. 21, 2018, 16 pages.

Schaub et al., "Emergence of Slow-Switching Assemblies in Structured Neuronal Networks," PLOS Computational Biology, Jul. 15, 2015, retrieved Jan. 9, 2019, from https://journals.plos.org/ploscompbiol/article?id=10.1371/journal.pcbi.1004196, 28 pages.

* cited by examiner

| Record | Month | Revenue | Expenses | Profit |
|---|---|---|---|---|
| 1 | April 2017 | 93,242 | 52,325 | 40,917 |
| 2 | May 2017 | 84,221 | 56,323 | 27,898 |
| 3 | June 2017 | 123,421 | 52,335 | 71,086 |
| 4 | July 2017 | 50,532 | 40,864 | 9,668 |
| 5 | August 2017 | 92,561 | 72,635 | 19,926 |
| 6 | September 2017 | 74,426 | 63,964 | 10,462 |
| 7 | October 2017 | 145,352 | 78,648 | 66,704 |
| 8 | November 2017 | 225,523 | 122,838 | 102,685 |
| 9 | December 2017 | 210,353 | 152,003 | 58,350 |

DATA REPORTING SYSTEM AND METHOD

CROSS-REFERENCE TO RELATED APPLICATION

This application incorporates by reference for all purposes the full disclosure of co-pending U.S. patent application Ser. No. 15/713,034, filed concurrently herewith, entitled "VOICE DRIVEN ANALYTICS".

BACKGROUND

In many businesses, retail sales, payroll, supply chain management, accounting, and other business functions are managed using computerized systems. These computerized systems collect and make available a steady stream of raw business intelligence data that can be used to monitor the health and operation of the business. However, the overwhelming amount of business intelligence data produced often makes it more difficult for a business manager to identify important trends, relationships, or other anomalies in the data. Therefore, improving the ability of the business manager to identify important insights into their business intelligence data is an important problem.

BRIEF DESCRIPTION OF THE DRAWINGS

Various techniques will be described with reference to the drawings, in which.

DETAILED DESCRIPTION

Figure 1:
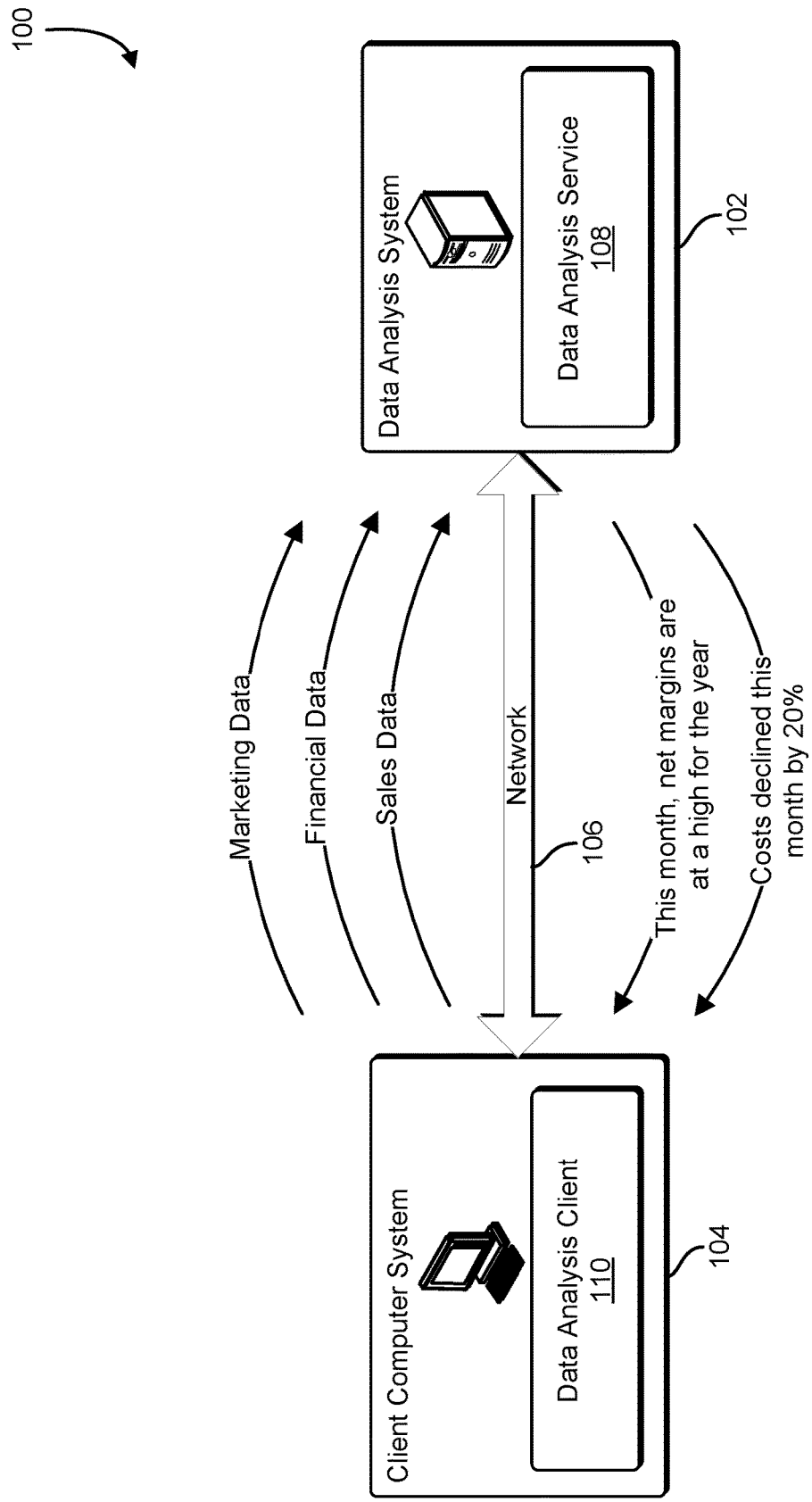
FIG. 1 shows a system in accordance with one embodiment.

The present document describes a business intelligence system that provides analytical insights into data sets that are provided by a user. In an embodiment, the business intelligence system includes a data analysis system that is accessed by the user via a client computer system. In an embodiment, the user provides data sets to the data analysis system, and the data analysis system identifies a number of insights about the data sets. In an embodiment, the insights include averages, trends, outliers, relationships, minimums, maximums, and other characteristics of the data sets. In an embodiment, the data analysis system generates a user interface, such as by rendering a web page, for presenting the data sets with the associated insights to the user. In an embodiment, the data analysis system supports a natural language interface. In an embodiment, the natural language interface allows a natural language query to be submitted to and processed by the data analysis system. In an embodiment, results of the natural language query are converted into a natural language form before they are provided to the user.

In an embodiment, the data analysis system selects a subset of insights to be presented to the user based on a score assigned to each individual insight. In an embodiment, the data analysis system collects metadata for each data set provided by the user. In an embodiment, the metadata includes column headings, column names, field names, data types, table names, and other descriptive data associated with the data set. In an embodiment, the data analysis system records usage patterns via the user interface, and uses the usage patterns to identify particular insights that are of interest to the user. In an embodiment, the data analysis system identifies particular data sets and particular data columns that are of special interest to the user. In an embodiment, using the above information, the data analysis system generates a score for each insight that indicates the relative importance of each insight. In an embodiment, using the score of each insight, the data analysis system selects the most important insights to be presented to the user. In an embodiment, the data analysis system presents the selected insights in order of importance.

In an embodiment, the data analysis system supports a natural language interface. In an embodiment, a microphone connected to the client computer system collects an audio stream produced by the user. In an embodiment, the client computer system sends the audio stream to the data analysis system. In an embodiment, the data analysis system produces a natural language query that is comprised of a sequence of words from the audio stream. In an embodiment, the data analysis system parses the sequence of words to produce a parse tree that represents an executable query. In an embodiment, the data analysis system walks the parse tree to perform the query and acquire an associated result. In an embodiment, the result is presented to the user. In an embodiment, the result is converted into a natural language sequence, and the natural language sequence is converted into an audio stream which is played for the user.

In an embodiment, the data analysis system supports an active listening interface that allows the data analysis system to interject insights into a conversation between two or more users. In an embodiment, a plurality of users engage in a conversation which is recorded using an audio input device (e.g., stand-alone microphone or device with integrated microphone) and then analyzed by the data analysis system. In an embodiment, the data analysis system identifies each individual user in the plurality of users, and further identifies data sets that are associated with individual users. In an embodiment, the audio of the conversation is processed into a sequence of words, and the data analysis system examines the sequence of words to determine when an identified data set is discussed. In an embodiment, when an identified data set is discussed in the conversation, the data analysis system generates a set of relevant insights for the data set and presents the relevant insights to the plurality of users. In an embodiment, the data analysis system converts the relevant insights into a natural language description of the insights. In an embodiment, the natural language description of the insights is converted to an audio stream, and the audio stream is played for the plurality of users.

FIG. 1 shows a system in accordance with one embodiment. In an embodiment, a block diagram 100 illustrates a data analysis system 102 that produces insights for data sets provided by the user via the client computer system 104. In an embodiment, the data analysis system 102 includes a computer system such as a server computer system, server cluster, virtual computer system, mobile computing device, network appliance, or embedded computer system. In an embodiment, the data analysis system 102 is implemented using a serverless processing service. In an embodiment, the data analysis system 102 includes a processor and a memory for containing instructions that are executed on the processor. In an embodiment, the data analysis system 102 includes a network interface that allows the data analysis system 102 to communicate with the client computer system 104 over a network 106.

In an embodiment, the data analysis system 102 hosts a data analysis service 108. In an embodiment, the data analysis service 108 is implemented with a set of instructions that are stored on a memory of the data analysis system 102, and the instructions are executed by a processor of the data analysis system 102 to perform the functions associated with analyzing user data sets.

In an embodiment, the client computer system 104 includes a data analysis client 110. In an embodiment, the client computer system 104 is a computer system, computer server, mobile device, cellular device, laptop computer, a smart phone, or other computing device having a processor and memory for storing computer-executable instructions. In an embodiment, the data analysis client 110 is implemented using executable instructions which are stored on the memory of the client computer system 104 and are executed by a processor of the client computer system 104. In an embodiment, as a result of executing the executable instructions, the client computer system 104 performs the functions of interacting with the data analysis system 102. In an embodiment, the data analysis client 110 is a web browser, and the data analysis system 102 provides an interface to the client computer system by providing a Web server.

In an embodiment, the client computer system 104 provides a user interface that allows a user to interact with the data analysis system 102. In an embodiment, the user interface is a display screen, keyboard, and mouse. In an embodiment, the user interface includes an audio input device such as a microphone that captures an audio stream produced by the user. In an embodiment, the audio stream produced by the user is sent to the data analysis system 102, and the data analysis system 102 identifies a sequence of words from the audio stream that represent a natural language query. In an embodiment, the audio stream produced by the user is processed by the data analysis client 110 into a sequence of words that represents a natural language query, and the natural language query is transmitted to the data analysis system 102 over the network 106. In an embodiment, the client computer system includes an audio output device such as a speaker or headphones. In an embodiment, the client computer system 104 receives results from the data analysis system 102 in the form of a natural language sequence, and the client computer system 104 converts the natural language sequence into an audio stream which is played for the user. In an embodiment, the client computer system receives an audio stream from the data analysis system 102, and the client computer system plays the audio stream for the user using the audio output device.

In an embodiment, a user collects one or more data sets on the client computer system 104, and uploads the data sets to the data analysis system 102 via the network 106. In an embodiment, the user uploads a marketing data set, a financial data set, and the sales data set. In an embodiment, the data analysis system 102 processes the data sets and identifies a set of insights for the data sets. In an embodiment, the insights are statistical measures, relationships, minimum and maximum values, trends, and other characteristics of the data sets. In an embodiment, the data analysis system identifies a relevant subset of the insights using metadata gleaned from the data sets, user feedback, and user history information. In an embodiment the relevant subset of the insights is sent from the data analysis system 102 to the client computer system 104 and is presented to the user.

Figure 2:
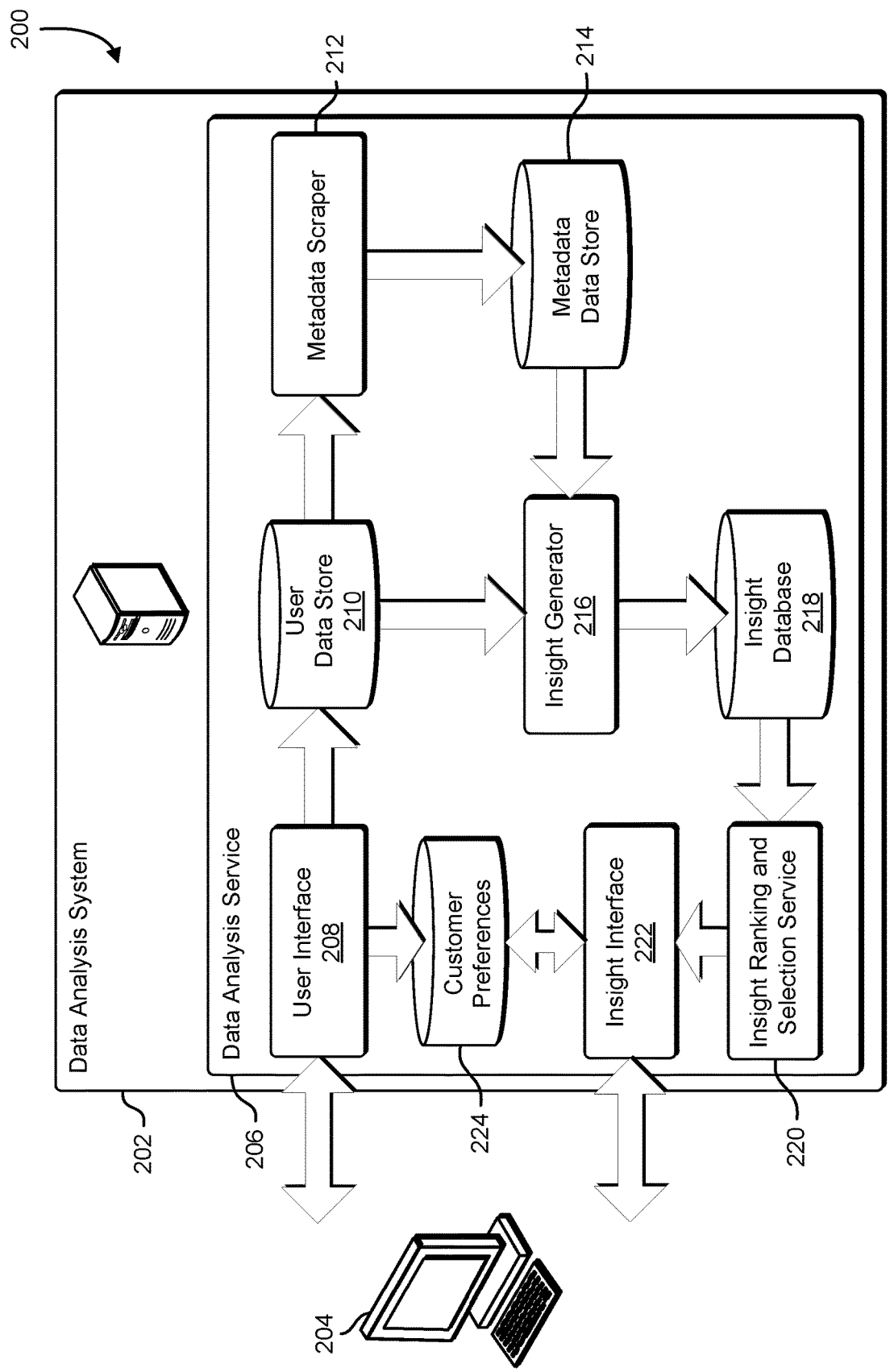
FIG. 2 shows an illustrative example of a data analysis system in accordance with one embodiment.

FIG. 2 shows an illustrative example of a data analysis system in accordance with one embodiment. A block diagram 200 of FIG. 2 illustrates a data analysis system 202 in an embodiment that analyzes data sets provided by a user and to produce a set of related insights. In an embodiment, the data analysis system 202 hosts a data analysis service 206. In an embodiment, the data analysis service 206 is implemented using executable instructions which are stored on a memory in the data analysis system 202. In an embodiment, as a result of being executed by the processor on the data analysis system 202, the instructions cause the data analysis system 202 to implement the data analysis service 206. In an embodiment, the data analysis system can include a computer system, server computer system, network appliance, virtual computer system, or other computing resource.

In an embodiment, the user submits one or more data sets to the data analysis service 206 using a client computer system 204, and the data sets are received by a user interface 208. In an embodiment, the user interface 208 is a web interface and the client computer system 204 includes a web browser that is used by the user to upload data sets to the data analysis service 206. In an embodiment, the user interface 208 includes a file transfer protocol ("FTP") server for uploading the data sets. In an embodiment, the user interface 208 is accessed via a remote procedure call ("RPC") interface. In an embodiment, metadata is provided by the user with the data sets. In an embodiment, the metadata includes a name for the data set, a name for each table in the data set, a name for each data field, a name for each column and row of the data set, type and formatting information for each data field, and descriptive information. In an embodiment, the metadata includes a natural language description of the data. In an embodiment, the data analysis system 202 stores the data sets in a user data store 210. In an embodiment, the user data store 210 is a memory, disk drive, or other storage device on the data analysis system 202.

In an embodiment, the metadata scraper 212 stores the metadata in a metadata data store 214. In an embodiment, the metadata scraper 212 analyzes the data sets in the user data store 210 to produce additional metadata. In an embodiment, the metadata scraper examines the data in the data sets, and determines a level of importance for each data element. In an embodiment, the level of importance is based at least in part on the variability of the data, the data type of the data, and the degree of population of the data. In an embodiment, the metadata scraper 212 determines one or more natural language names that are associated with the data sets. In an embodiment, the natural language names are determined by a database name, data table name, or filename in which the data set is stored. In an embodiment, a data set includes a number of data fields, and the metadata scraper 212 determines a name for each data field in a data set. In an embodiment, a data field name is determined based on a column name and a data table, in an embodiment, and data field name is determined based on a header row in a data table. In an embodiment, a name for a data field is determined by examining a user interface form, and identifying labels that are associated with particular data fields.

In an embodiment, the metadata scraper 212 is implemented using a set of data source plug-ins. In an embodiment, the metadata scraper 212 loads a data source plug-ins for extracting metadata on demand. In such embodiments, when presented with the data set, the metadata scraper 212 identifies the type of the data set and installs a corresponding plug-in that is capable of extracting metadata from the data set of the identified type. Data set types include databases of various types (such as Oracle databases, MySQL databases, or other relational databases) or data files having various formats (CSV, TXT, XLS). In various embodiments, plug-ins are implemented in a scripting language such as JavaScript, Java, Python, or Perl. In an embodiment, the metadata scraper 212 provides a sandboxed environment for running plug-ins in an isolated environment. In various embodiments, the sandboxed environment is implemented using a virtual address space for each plug-in or virtual machine for each plug-in. In an embodiment, the sandboxed environment is implemented using a container runtime.

In an embodiment, an insight generator 216 in the data analysis service 206 processes the data sets in the user data store 210 using the metadata stored in the metadata data store 214 to produce a set of insights for each data set. In an embodiment, the insights are statistical measures, averages, minimums and maximums, trends, relationships between data sets, or other characteristics of the data sets. In an embodiment, the insight generator 216 stores the generated insights to an insight database 218. In an embodiment, the insight generator 216 includes an executive that manages a set of pluggable data analysis will modules where each pluggable data analysis module produces a particular type of insight. In an embodiment, an administrator is able to configure the data analysis service 206 to add or remove support for specific types of insights by adding or removing corresponding pluggable data analysis modules.

In an embodiment a particular pluggable module is implemented using a scripting language such as Java, JavaScript, or Perl provided a corresponding runtime engine is provided within the insight generator 216. In an embodiment, a particular pluggable module is implemented using an intermediate runtime where the corresponding intermediate runtime engine is provided by the insight generator 216. In an embodiment, pluggable modules are libraries of executable instructions that can be dynamically loaded by the insight generator 216. In an embodiment, each library includes a set of defined functions that define a signature common to all pluggable modules. In an embodiment, the set of defined functions includes a registration function that allows the insight generator 216 to obtain a description for the insight. In an embodiment, the set of defined functions include an insight function and a confidence function. In an embodiment, the insight function takes a data set parameter and returns a set of insights (for the insight type associated with the plug-in), and a level of confidence for each insight detected. For example, an insight plug-in for outlier detection could have a function that returns the outliers for a particular data set and a function that returns a level of confidence for each outlier detected.

In an embodiment, an insight ranking and selection service 220 develops a score for each insight in the insight database 218. In an embodiment, the insight generator 216 and provides the insight ranking and selection service 220 with the base score for each type of insight. In an embodiment, the insight generator 216 provides an initial adjustment to the base score based on the level of confidence that the insight generator 216 has any identity of each insight. For example, the insight generator 216 may provide a positive initial adjustment for detected outlier based on the statistical variation of the outlier with respect to the remaining data. In an embodiment, the score represents a level of importance for the insight for the user. In an embodiment, the score is based at least in part on the characteristics of the data, the type of the data, and the type of the insight. In an embodiment, the insight ranking and selection service 220 selects a subset of insights to be presented to the user. In an embodiment, the subset of insights is selected based on the individual insight scores. In an embodiment, an insight interface 222 provides the insights to the user via the client computer system 204. In an embodiment, the insights are provided via a web interface to a browser running on the client computer system 204. In an embodiment, the insights are converted into a natural language, and the natural language insights are provided to the user via the client computer system 204.

In an embodiment, the user submits insight preferences to the data analysis service using a user interface on the client computer system 204. In an embodiment, the insight interface 222 receives the preferences and stores the customer preferences in a customer preferences data store 224. In an embodiment, user interactions with the data analysis service 206 are recorded in the customer preferences data store 224, and are used to identify insights that are important to the user. In an embodiment, the insight ranking and selection service 220 retrieves history information and user preferences from the customer preferences data store 224 to refine the score of individual insights.

In an embodiment, a user submits a data set to the data analysis service 206 via the client computer system 204. In an embodiment, the data set is received by the user interface 208 which saves the data set in the user data store 210. In an embodiment, preferences provided by the user are recorded in the customer preferences data store 224. In an embodiment, the customer preferences data store 224 may be implemented as a key value store where individual preferences are indexed to a customer ID, customer name, or other user-identifying value. In an embodiment, the customer preferences data store 224 is maintained as a relational database. In an embodiment, the metadata scraper 212 processes the received data sets to extract metadata which is stored in the metadata data store 214. In an embodiment, the insight generator 216 uses the data sets and the metadata to generate a set of insights for the data set, and the insights are stored in the insight database 218. In an embodiment, the insight ranking and selection service 220 retrieves the insights from the insight database 218 and generates an ordered list of insights to be presented to the user. In an embodiment, the insight interface 222 further refines the selection of insights using the customer preferences and provides the insights to the user via a user interface on the client computer system.

Figure 3:
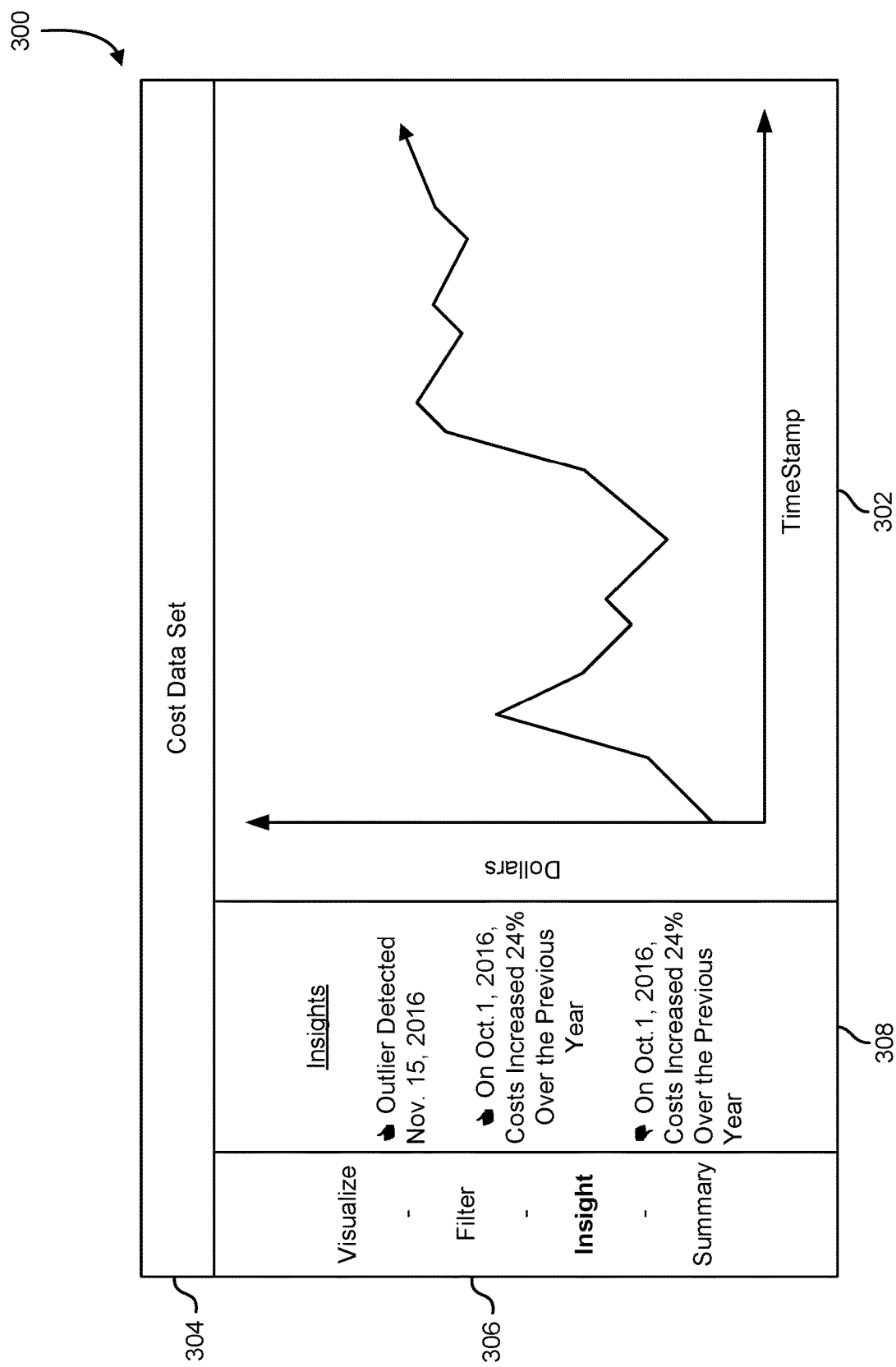
FIG. 3 shows an illustrative example of a user interface provided by a data analysis system in accordance with one embodiment.

FIG. 3 shows an illustrative example of a user interface provided by a data analysis system in accordance with one embodiment. In an embodiment, a diagram 300 illustrates a user interface that is provided by a data analysis system. In an embodiment, the user interface includes a data graph 302, a status bar 304, a control menu 306, and an insight display 308. In an embodiment, a user connects to the data analysis system via a client computer system, and the data analysis system provides a user interface definition to the client computer system which is displayed on a screen connected to the client computer system. In an embodiment, the client computer system is a computer system running a browser, and the data and analysis server includes a Web server. In an embodiment, the data analysis system provides hypertext markup language ("HTML") code that represents the user interface content.

In an embodiment, the data graph 302 is a line graph or a bar graph representing a single data set. In an embodiment, the data graph 302 is a multi-line graph or a multi-bar graph representing a plurality of data sets. In an embodiment, the status bar 304 displays a name of the data set or data sets displayed in the data graph 302. In an embodiment, the status bar 304 includes a selection control that allows the user to select one or more user data sets for display in the user interface. In an embodiment, the control menu 306 allows the user to display various information related to the selected data sets. In an embodiment, the control menu 306 allows the user to display insights detected by the data analysis system. In an embodiment, the insight display 308 lists a set of insights selected by the data analysis system as being relevant to the user. In an embodiment, the insight display 308 includes a clickable element such as a thumbs-up or thumbs-down button for each displayed insight. In an embodiment, by clicking the clickable element, the user is able to indicate to the data analysis system whether the insight is relevant or not. In an embodiment, indications provided by the user are saved by the data analysis system in a user preferences database.

In an embodiment, the user interface displays insight information on the data graph 302. In an embodiment, when the user selects a particular insight in the insight display 308, the data analysis system updates the data graph 302 to indicate relevant portions of the data set. In an embodiment, if the user selects a data maximum insight, the data analysis system updates the data graph 302 to highlight the data point associated with the data maximum insight. In an embodiment, if the user selects a trend insight, the data analysis system updates the data graph 302 to highlight the portion of the data set associated with a trend. In an embodiment, if the user selects a data correlation insight, the data analysis system updates the data graph 302 to highlight the portions of the data sets that are correlated with each other.

Figure 4:
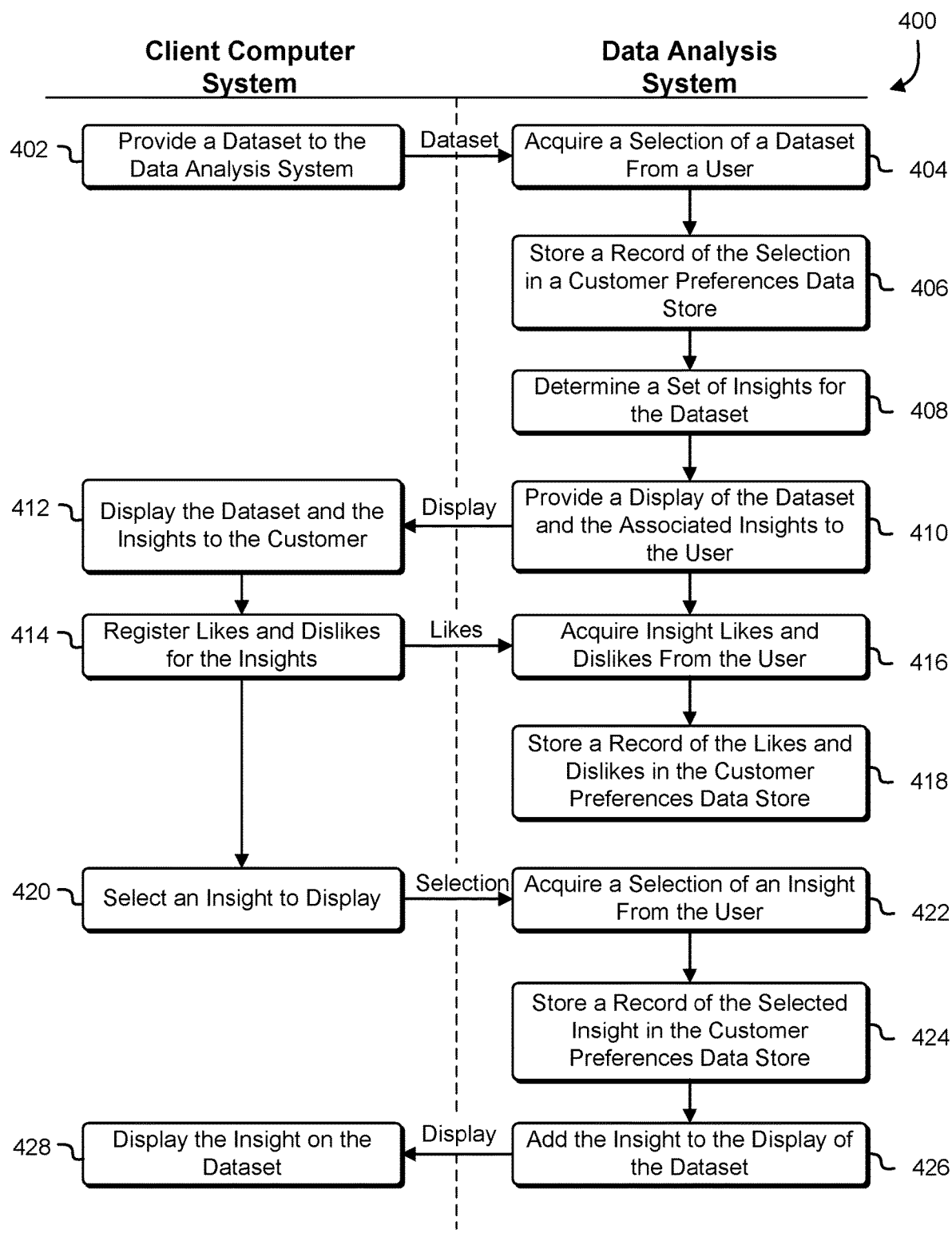
FIG. 4 shows an illustrative example of a process in accordance with one embodiment.

FIG. 4 shows an illustrative example of a process in accordance with one embodiment. In an embodiment, a swim diagram 400 illustrates a process that, as a result of being performed by a client computer system and a data analysis system, displays a set of insights for a user data set and collects customer preferences for the set of insights. In an embodiment, the process begins with a user collecting data sets on the client computer system. In an embodiment, at block 402, the user causes the client computer system to upload one or more data sets to the data analysis system.

In an embodiment, at block 404, the data analysis system receives the data sets from the client computer system and stores them on a storage device accessible to the data analysis system. In an embodiment, the data analysis system receives information from the client computer system indicating a selection of a particular data set by the user. In an embodiment, the user selects the data set by clicking on a user interface element of a webpage presented on the client computer system and served by the data analysis system. In an embodiment, at block 406, the data analysis system stores a record of the selection in a consumer preferences data store.

In an embodiment, the data analysis system generates 408 a set of insights for the selected data set. In an embodiment, the insights include a set of identified outliers, a relationship with another data set, a trend demonstrated by the data set, a statistical measure of the data set, or other characteristic of the data set. In an embodiment, an outlier is defined as a data point that lies an abnormal distance from other values in the data set. In embodiment, an outlier is determined by comparing particular values to an average or mean value for the data set. In an embodiment, outlier algorithms are provided that identify point outliers, contextual outliers, or collective outliers. In an embodiment, contextual outlier is a data point that is anomalous in a particular context of nearby data points. In an embodiment, a collective outlier is a data point that is anomalous with respect to the remaining data set as a whole. In various embodiments, the data analysis service implements versions of Peirce's criterion, Turkey's fences, or the Modified Thompson Tau test in order to detect outliers in the data set. In an embodiment, the data analysis system selects a subset of possible insights for display to the user. In an embodiment, the subset of insights is determined based at least in part on the type of each insight, and customer preferences and usage patterns monitored by the data analysis system. In an embodiment, at block 410, the data analysis system provides a display of the data set and the associated insights to the customer. In an embodiment, the data set and the associated insights are displayed by serving a webpage to a web browser running on the client computer system.

In an embodiment, the data analysis system generates a visualization of a user data that includes single or multi-series time-series data. In an embodiment, the user is presented with a summary of metrics that include period-to-period comparisons, growth-rate calculations, identifying highs and lows as well as top and bottom movers across categories. For example, in an embodiment, a multi-series line chart with product, revenue and time are provided. Examples of insights that may be provided by the data analysis system include:

Period-over-Period comparison—"Total sales increased by 7% Week-over-Week to $21.3 MM"

Growth-rate calculation—"4-week compounded growth rate is 5%"

Highs and Lows—"Highest sales month is August 2016 with sales totaling $22.5 MM"

Top movers/bottom movers—"Outdoor Equipment $4.5 MM (12% increase)" . . . .

Distribution of data—Shows a distribution (histogram) of the dimensions and measures in the visualization.

In an embodiment, users are able to take actions towards these insights such as modifying the date aggregations (e.g., from week over week to month over month) and and are able to click-to-add these summarized data as new visuals in the analysis.

In an embodiment, outlier detection helps users acquire insights faster by automatically pointing out "interesting" regions of a graph where the data behaves differently than expected. For many users, outliers often indicate a change in the underlying data that is worth investigating. For many data sets, outliers are difficult to identify visually, particularly in "busy" graphs with lots of data series. In an embodiment, the data analysis system also has the ability to perform statistically rigorous analysis, which is superior to subjective user judgment. In an embodiment, the data analysis system implements a number of models including linear regression, exponential regression, exponentially weighted moving averages and more sophisticated forecasting models like Holt-Winters. In an embodiment, these models allow the data analysis system to account for the overall trend for the graph and identify deviations from the expected trends. In an embodiment, outlier detection capability is improved over time as the data analysis system develops more sophisticated forecasting models and mechanisms, and chooses automatically between them. In an embodiment, the data analysis system accounts for seasonality in the data in addition to the overall trend.

In an embodiment, the data analysis system implements a contribution analysis. In an embodiment, contribution analysis allows a user to identify the drivers behind a change in the data. In an embodiment, the data analysis system presents the user with the option to select a dependent field on which to run statistical analysis to identify correlations and contributions to the total. In some embodiments, the data analysis system performs the contribution analysis without requiring any customer input. In an embodiment, the data analysis system allows users to easily incorporate additional analytics to their visuals that would otherwise have to be generated manually by the user. In various embodiments, the data analysis system supports additional analytics that include drawing a trend line over time-series data, forecasting a metric x period out, and toggling between time aggregation for different perspectives.

In an embodiment, the data analysis system provides suggestions on what fields and tables to join within a data source. In an embodiment, the data analysis system automatically interprets the data model by matching fields across multiple tables as a mean to bootstrap join recommendations for a particular database and then uses machine learning to learn about the join patterns of other users and recommend join relationships to them. This embodiment is particularly effective where many users have access to the same data sources to perform ad-hoc analytics.

In an embodiment, the data analysis system supports four primitive data types: Integer, decimal, string and dates. In an embodiment, the data analysis system may be expanded to support additional types such a currency and geospatial data in order to present improved visualizations to the user. In such embodiments, currency types are formatted as such in the visuals without having users manually identify a field as currency. In an embodiment, geospatial types are able to be automatically rendered on maps (when supported) rather than bars.

In an embodiment, collaborative filtering ("CF") is a popular recommendation algorithm that bases its predications and recommendations on the ratings or behavior of other users in the system. In an embodiment, collaborative filtering allows other users' opinions are used to generate a reasonable predication of the active user's preference. In an embodiment, the data analysis system is leveraged to aid in discovery or search of key metrics by harnessing access patterns within a customer account.

In an embodiment, at block 412, the client computer system receives the display information from the data analysis system and displays the data set and the insights to the customer. In an embodiment, the client computer system includes a display of the insights with selectable user interface elements that allow the user to indicate which insights are relevant and which are not relevant. In an embodiment, at block 414, the client computer system records which insights are relevant based on indications provided by the user and by which insights the user selects for viewing. In an embodiment, the client computer system provides the likes and dislikes of the user to the data analysis system.

In an embodiment, at block 416, the data analysis system receives the likes and dislikes of the user. In an embodiment, the client computer system also indicates to the data analysis system which insights were selected and viewed by the user. In an embodiment, at block 418, the data analysis system records the likes and dislikes of the user in a customer preferences data store. In an embodiment, the data analysis system records the insights viewed by the user in the customer preferences data store.

In an embodiment, at block 420, after registering the likes and dislikes of the insights, the client computer system allows the user to select a particular insight to be displayed on the user interface. In an embodiment, at block 422, the data analysis system requires the selection from the client computer system. In an embodiment, the available insights are displayed in the menu on the client computer system user interface where the user selects a particular insight, causing the client computer system to indicate the selection to the data analysis system in the form of a parameter on a call to a Web service. In an embodiment, at block 424, the data analysis system stores a record of the selected insight in the customer preferences data store. In an embodiment, at block 426, the data analysis system updates the user interface information to highlight the selected insight, and sends the updated display information to the client computer system. In an embodiment, the client computer system receives the updated display information and displays 428 the updated display information to the user. In an embodiment, the updated display information is in the form of an updated webpage that is displayed in a browser on the client computer system.

Figure 5:
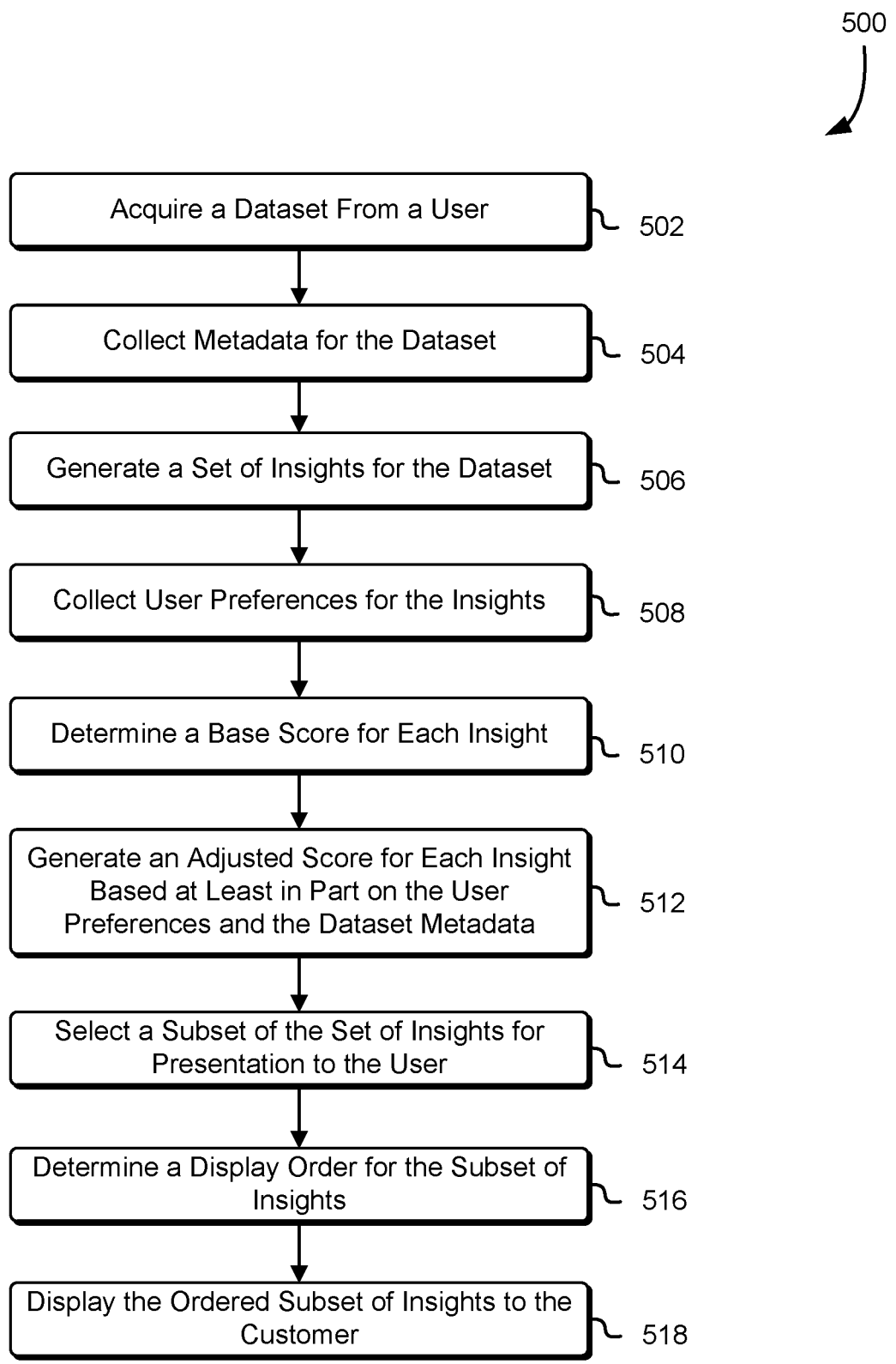
FIG. 5 shows an illustrative example of a process in accordance with one embodiment.

FIG. 5 shows an illustrative example of a process in accordance with one embodiment. In an embodiment, a flowchart 500 illustrates a process that, as a result of being performed by a data analysis system, produces an ordered list of insights for a customer data set in accordance with the set of customer preferences. In an embodiment, at block 502, the data analysis system acquires a data set from a user via the client computer system. In an embodiment, at block 504, the data analysis system collects metadata for the acquired data set. In an embodiment, metadata includes column names, column descriptions, field names, field descriptions, data types for each field, statistical measures of each field including the percentage of fields populated with data, and other descriptive information. In an embodiment, at block 506, the data analysis system generates a set of insights for the data set. In an embodiment, insights include statistical measures, minimums, maximums, correlations and other relationships, outliers, year-over-year comparisons, and other characteristics of the data set. In an embodiment, insights are arranged in the form of a natural language statement that is generated using the metadata associated with the data set.

In an embodiment, at block 508, the data analysis system collects a set of user preferences from the user via the client computer system. In an embodiment, the client computer system sends information to the data analysis system indicating which insights are preferred and which insights are selected and viewed by the user. In an embodiment, at block 510, the data analysis system determines a base score for each insight. In an embodiment, the score represents the relevance of the insight to the user. In an embodiment, the base score for each insight is based at least in part on the type of the insight. In an embodiment, the base score for each insight is based at least in part on the level of confidence in determining the insight. In an embodiment, for insight that identifies outline data points in the data set, the level of confidence is based at least in part on the degree of the outlier associated with the insight. In an embodiment, for insight that identifies a correlation between two data sets, the level of confidence is based at least in part on the degree of correlation between the data sets.

In an embodiment, at block 512, the data analysis system adjusts the score of each insight using a number of adjustment factors. In an embodiment, the score of individual insights are adjusted based on the user preferences. In an embodiment, the score of the individual insights are adjusted based on the metadata of the data set that is associated with the individual insight. In an embodiment, an insight is given a higher score if the datatype associated with the insight is a currency type. In an embodiment, an insight is given a higher score if the user has viewed similar types of insights in the past. In an embodiment, an insight is given a higher or lower score as a result of the user having given the insight a thumbs up or thumbs down indication in the user interface.

In an embodiment, at block 514, the data analysis system uses the adjusted scores of the insights to select a subset of the insights for presentation to the user. In one embodiment, the data analysis system selects a set of insights having an adjusted score greater than a threshold value. In one embodiment, the data analysis system selects a fixed number of insights having the highest relative adjusted scores. In an embodiment, at block 516, the data analysis system determines a display ordering for the subset of selected insights. In an embodiment, the order of the selected insights is determined by ordering the insights according to the relative adjusted scores. In an embodiment, at block 518, the data analysis system displays an ordered list of the selected insights to the user. In an embodiment, the data analysis system provides HTML, code that describes a selectable menu to the client computer system, and the client computer system displays the selectable menu to the user.

Figure 6:
FIG. 6 shows an illustrative example of a customer data set in accordance with one embodiment.

FIG. 6 shows an illustrative example of a customer data set in accordance with one embodiment. In an embodiment, a data diagram 600 illustrates a user data set with associated metadata that can be used by a data analysis system. In an embodiment, the user data set includes a record column 602, a month column 604, a revenue column 606, and expenses column 608, and a profit column 610. In an embodiment, the record column 602 includes an integer index for each record. In an embodiment, the month column 604 specifies a particular month for each data record. In an embodiment, the revenue column 606 holds an amount of revenue, denominated in a currency, for the associated month. In an embodiment, the expenses column 608 holds an amount of expenses for the associated month, denominated in a currency. In an embodiment, the profit column 610 is a summary column that holds the difference between revenue and expenses for the month.

In an embodiment, the user data set holds a set of records. In an embodiment a heading record 612 holds a natural language description of each column. In an embodiment, the user data set includes a collection of data records 614, 616, 618, 620, 622, 624, 626, 628, and 630. In an embodiment, each individual data record in the collection of data records holds a set of values.

In an embodiment, the data analysis system extracts various metadata from the user data set. In an embodiment, the data analysis system extracts column names from the heading record 612. In an embodiment, the data analysis system examines the data contained in each data column and determines and associated data type for the column.

Figure 7:
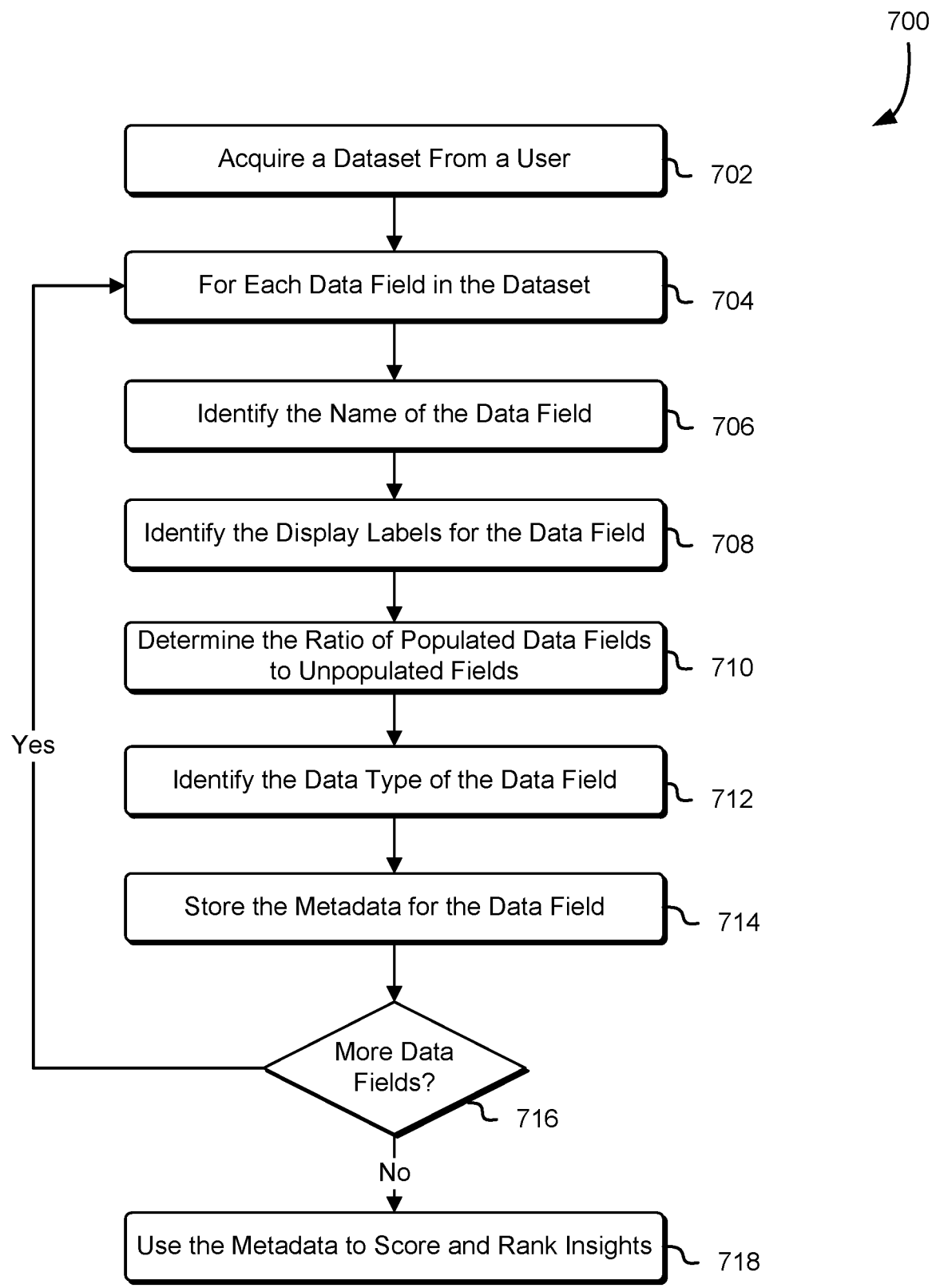
FIG. 7 shows an illustrative example of a process in accordance with one embodiment.

FIG. 7 shows an illustrative example of a process in accordance with one embodiment. In an embodiment, a flowchart 700 illustrates a process that, as a result of being performed by a data analysis system, collects metadata for the data set and uses the metadata to generate a score for individual insights of the data set. In an embodiment, at block 702, a data analysis system acquires a data set from a user via the client computer system. The data set includes one or more records, and each record includes one or more data fields or columns.

In an embodiment, at block 704, the data analysis system iterates over each field of the data set. In an embodiment, at block 706, the data analysis system identifies a name for the iterated data field. In an embodiment, the data analysis system identifies the name by determining the column heading for the iterated data field. In an embodiment, the data analysis system identifies the name using metadata associated with the data set. In one embodiment, the data analysis system identifies the name of the iterated data field by querying the user. In an embodiment, at block 708, the data analysis system identifies display labels used for the data field. In an embodiment, the display labels are identified by examining user interface forms and definitions that contain the iterated data field. In an embodiment, the user interface form is an HTML, form containing the iterated data field. In an embodiment, at block 710, the data analysis system examines the data records of the data set to determine the ratio of populated records to unpopulated records for the iterated data field. In an embodiment, populated records are records that contain a data value and unpopulated records are records that contain an empty string, null string, or a null value indicating the absence of data. In an embodiment, at block 712, the data analysis system identifies the datatype stored in the data field. In an embodiment, the datatype is determined by examining the data in the data field. In an embodiment, at block 714, the data analysis system stores the information determined above as metadata for the iterated data field. In one embodiment, the metadata is stored in the metadata data store on the data analysis system.

At decision block 716, the data analysis system determines whether there are additional fields in the data set. If there are additional fields in the data set, execution returns to block 704 and the data analysis system processes the next data field in the data set. If there are not additional fields in the data set, execution advances to block 718. In an embodiment, at block 718, the data analysis system uses the metadata stored in the metadata data store to determine a score for individual insights in a set of insights associated with the data set. In an embodiment, the data analysis system uses the score of individual insights to order a selected subset of the insights for display to the user.

Figure 8:
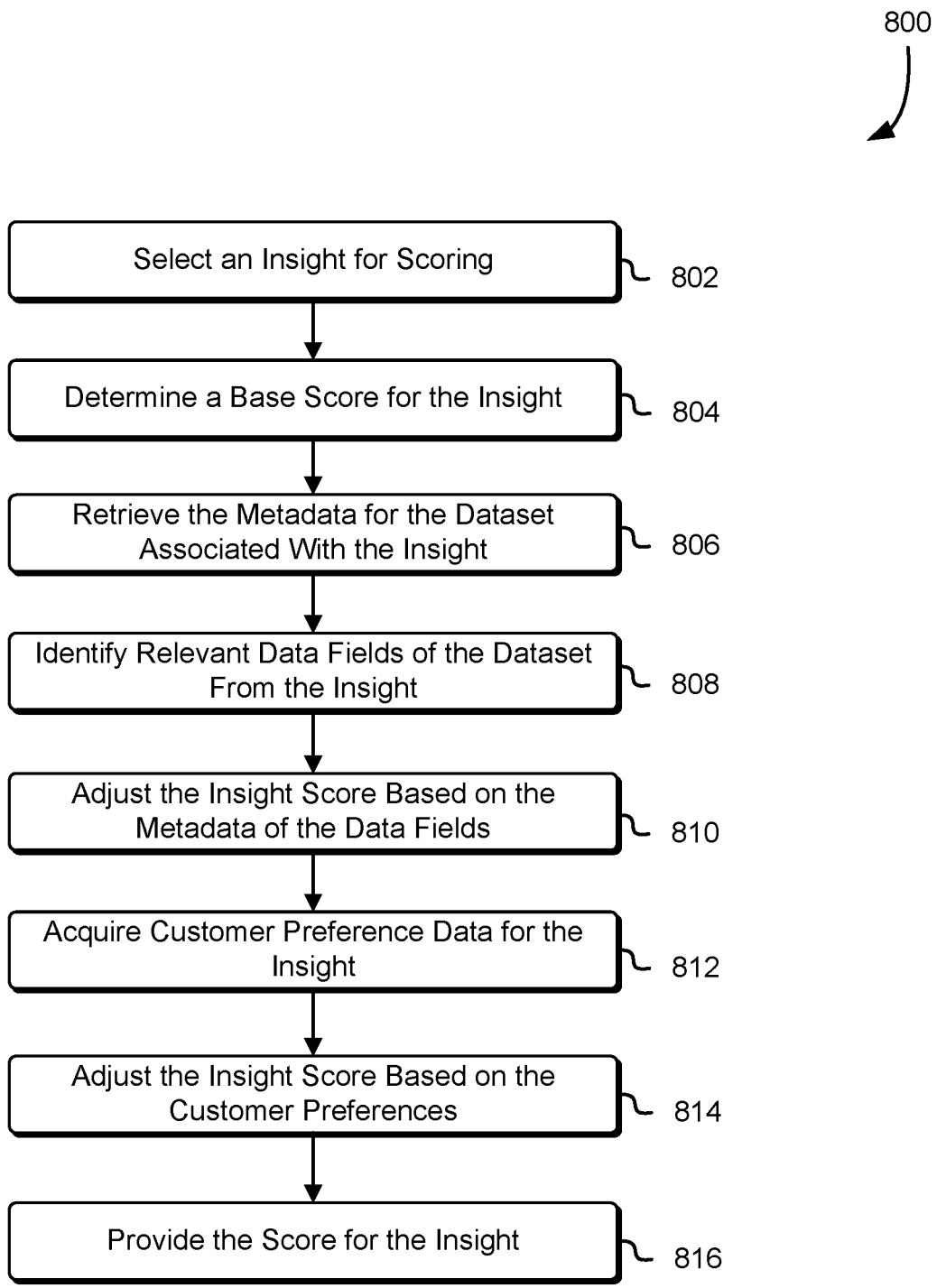
FIG. 8 shows an illustrative example of a process in accordance with one embodiment.

FIG. 8 shows an illustrative example of a process in accordance with one embodiment. In an embodiment, a flowchart 800 illustrates a process that, as a result of being performed by a data analysis system, generates a score for an individual insight. In an embodiment, at block 802, the data analysis system selects a particular insight for scoring. In an embodiment, the score represents the relevance of the particular insight to the user. In an embodiment, at block 804, the data analysis system generates a base score for the insight. In an embodiment, the base score is based at least in part on the type of the insight and a level of confidence produced by the insight-generating algorithm. In an embodiment, for an outlier insight, the level of confidence is based at least in part on the degree of the outlier. In an embodiment, for a correlation insight, the level of confidence is based on the degree of correlation between the two data sets.

In an embodiment, at block 806, the data analysis system retrieves, from a metadata data store, metadata for the data sets associated with the insight. In an embodiment, the metadata includes column names, datatypes, and data descriptions that are applicable to the insight. In an embodiment, the insight describes an outlier and the metadata describes that the outlier is an outlier in sales volume. In an embodiment, the insight describes a relationship between two data sets and the metadata allows the insight to be described as a relationship (such as a correlation) between advertising costs and sales volume. In an embodiment, at block 808, the data analysis system identifies data fields that are relevant to the insight. In an embodiment, the score of the insight is adjusted 810 using the metadata. In an embodiment, the score of the insight is increased if the data in the data set used by the insight is fully populated. In an embodiment, score of the insight is increased if the insight describes financial data.

In an embodiment, at block 812, the data analysis system acquires customer preference data that is relevant to the insight. In an embodiment, the customer preference data is used in preference data collected through UI by the client computer system. In an embodiment, the customer preference data is usage data collected by the client computer system and is applied to the data analysis system. At block 814, in an embodiment, the score of the insight is adjusted based at least in part on the customer preference data. In an embodiment, the score of the insight is increased if the insight has been referenced by the user in the past. In an embodiment, the score of the insight is increased or decreased based on expressed likes or dislikes of the user. In an embodiment, at block 816, the data analysis system provides the score for the insight to an insight interface component in the data analysis service, and the insight interface component uses the score to present an ordered subset of insights to the user.

Figure 9:
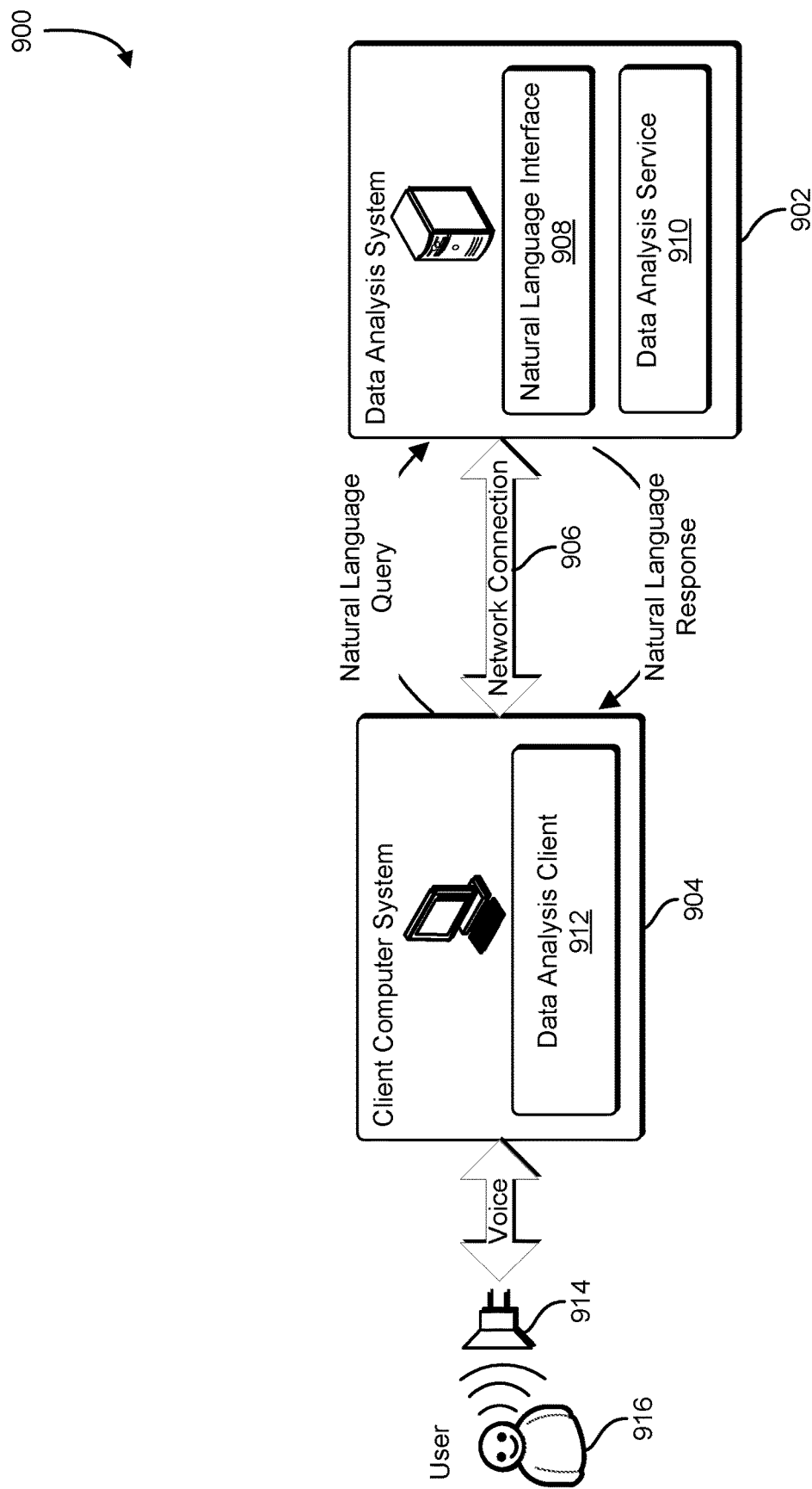
FIG. 9 shows an illustrative example of a data analysis system with voice control accordance with one embodiment.

FIG. 9 shows an illustrative example of a data analysis system with voice control in accordance with one embodiment. In an embodiment, a diagram 900 illustrates a data analysis system that includes a natural language interface. In an embodiment, the system includes a data analysis system 902 that is connected to the client computer system 904 via a network connection 906. In an embodiment, the network connection 906 is an Ethernet connection, a Wi-Fi connection, or fiber-optic connection, an infrared network connection, or radiofrequency network connection. In an embodiment, the data analysis system is a computer system, server computer system, server cluster, virtual computer system or computing service. In an embodiment, the data analysis system 902 includes a natural language interface 908 and a data analysis service 910. In an embodiment, the data analysis service 910 is a software component made of executable instructions that are stored in a memory on the data analysis system, and when the instructions are executed by a processor on the data analysis system 902, the instructions cause the data analysis system to analyze user data sets and produce a set of insights. In an embodiment, natural language interface 908 is a software interface component made up of executable instructions that, when executed by a processor on the data analysis system 902, cause the data analysis system 902 to translate the insights into a representation of a natural language statement.

In an embodiment, the natural language interface 908 receives the set of insights from the data analysis service 910, and using metadata of the data sets associated with the insight converts the insight into a natural language format. In an embodiment, the insight is an outlier in the data set and the natural language form of the insight describes the information represented by the outlier in a natural language statement. In an embodiment, the insight is a correlation between two data sets and the natural language version of the insight describes the correlated data in natural language terms such as "marketing expenses are correlated with sales volume."

In an embodiment, a data analysis client 912 receives the natural language version of the insight from the data analysis system 902. In an embodiment, the data analysis client 912 is comprised of executable instructions stored in a memory on the client computer system 904 that, when executed by a processor on the client computer system 904 cause the client computer system 904 to provide an interface to the data analysis system 902. In an embodiment, the data analysis client 912 is a web browser containing a browser plug-in that receives the natural language insight. In an embodiment, the data analysis client 912 presents the natural language insight to a user 916 using an audio interface device 914 that is coupled to the client computer system 904. In an embodiment, the audio interface device 914 is a speaker.

In an embodiment, the audio interface device 914 includes a microphone. In an embodiment, the microphone listens to spoken words uttered by the user 916 and provides an audio signal to the client computer system 904. In an embodiment, the data analysis client 912 receives the audio stream and sends the audio to the natural language interface 908 via the network connection 906. In an embodiment, the natural language interface 908 converts the audio stream into a set of tokens that represent words spoken by the user 916. In an embodiment, the set of tokens is processed by the data analysis system 902 into an executable query. In an embodiment, the conversion of the set of tokens is accomplished by mapping the words in the natural language query to data columns and data sets using metadata collected by the data analysis service 910.

Figure 10:
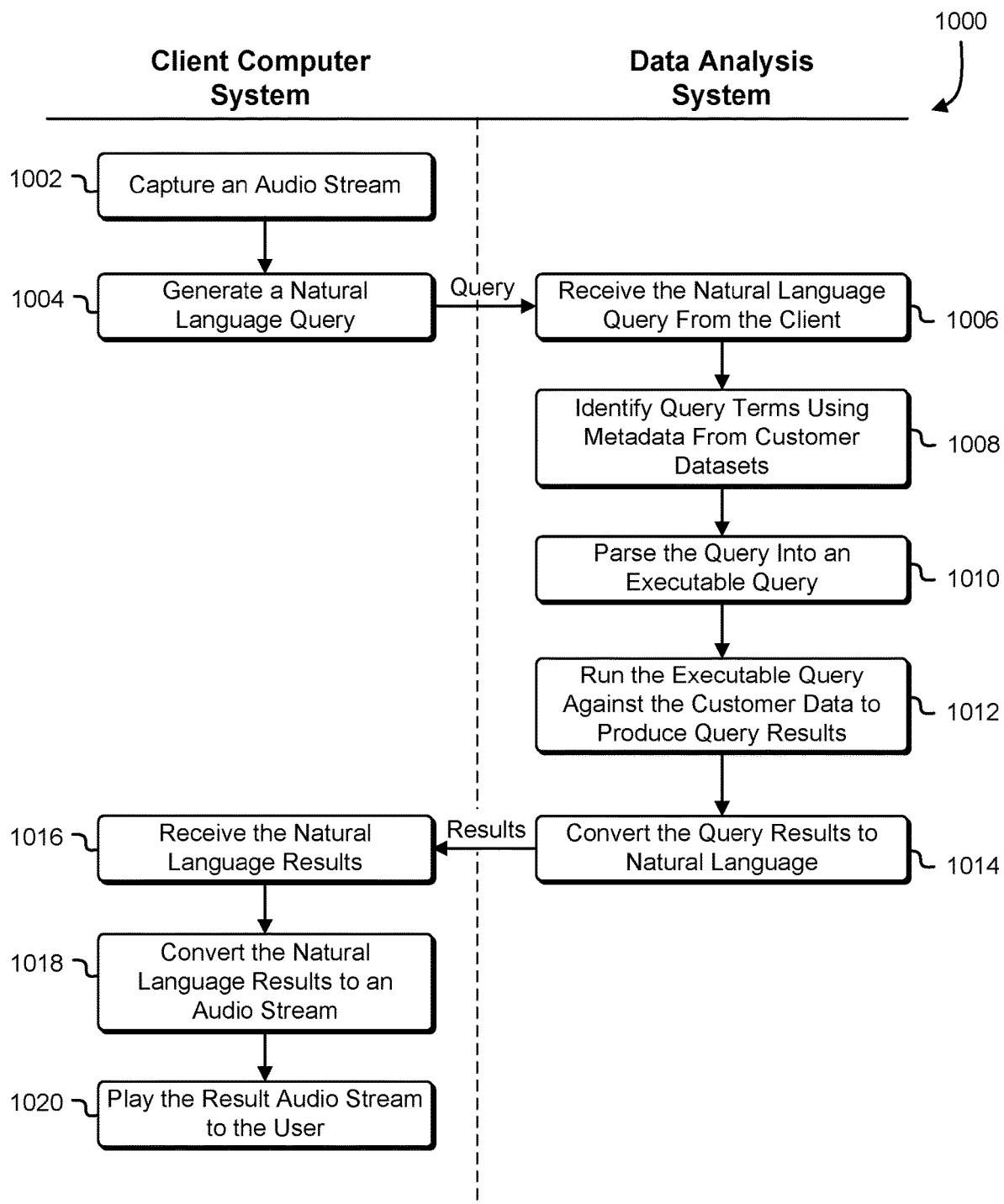
FIG. 10 shows an illustrative example of a process in accordance with one embodiment.

FIG. 10 shows an illustrative example of a process in accordance with one embodiment. In an embodiment, a swim diagram 1000 illustrates a process that, as a result of being performed by a client computer system and a data analysis system, processes a natural language query. In an embodiment, the process begins at block 1002 with the client computer system capturing an audio stream on the client computer system. In an embodiment, the audio stream is captured using a microphone on the client computer system. In an embodiment, the client computer system is a network-connected peripheral that is in communication with the data analysis system. In an embodiment, the client computer system is a cell phone capable of establishing a network connection to the data analysis system. In an embodiment, at block 1004, the client computer system converts the audio stream into a natural language query made up of a sequence of tokens representing natural language words, and the client computer system sends the token a natural language query to the data analysis system. In an embodiment, at block 1004, the client computer system sends the audio stream to the data analysis system and data analysis system converts the audio stream to a sequence of natural language tokens.

In an embodiment, at block 1006, the data analysis system acquires the tokenized natural language query from the client computer system. In an embodiment, at block 1008, the data analysis system identifies data sets that are associated with the user that provided the query, and then retrieves metadata that is associated with the identified data sets. In an embodiment, using the metadata, the data analysis system identifies links between named data sets, data fields, and data columns. In an embodiment, at block 1010, the data analysis system parses the language in the query to produce an executable query. In an embodiment, the executable query is stored in the form of a parse tree. In an embodiment, the executable query is generated in accordance with a set of rules defining a query syntax. In an embodiment, the executable query is generated in accordance with the rules of the structured query language ("SQL").

In an embodiment, at block 1012, the data analysis system runs the executable query against customer data to produce a set of query results. In an embodiment, running the executable query is accomplished by walking the parse tree. In an embodiment, at block 1014, the data analysis system converts the query results to a natural language result. In an embodiment, the query results are converted to a natural language result using metadata of the data set stored on the data analysis system. In an embodiment, the natural language result includes a natural language description of the data type and the column description extracted from the metadata. In an embodiment, the data analysis system sends the natural language results to the client computer system.

In an embodiment, at block 1016, the client computer system receives the natural language results from the data analysis system. In an embodiment, at block 1018, the client computer system displays the natural language results to the user on a display screen. In an embodiment, at block 1018, the client computer system converts the natural language results into an audio stream that can be played on an audio output device. In an embodiment, at block 1020, the client computer system plays the audio stream representing the natural language results on an audio output device such as a speaker that is connected to the client computer system.

Figure 11:
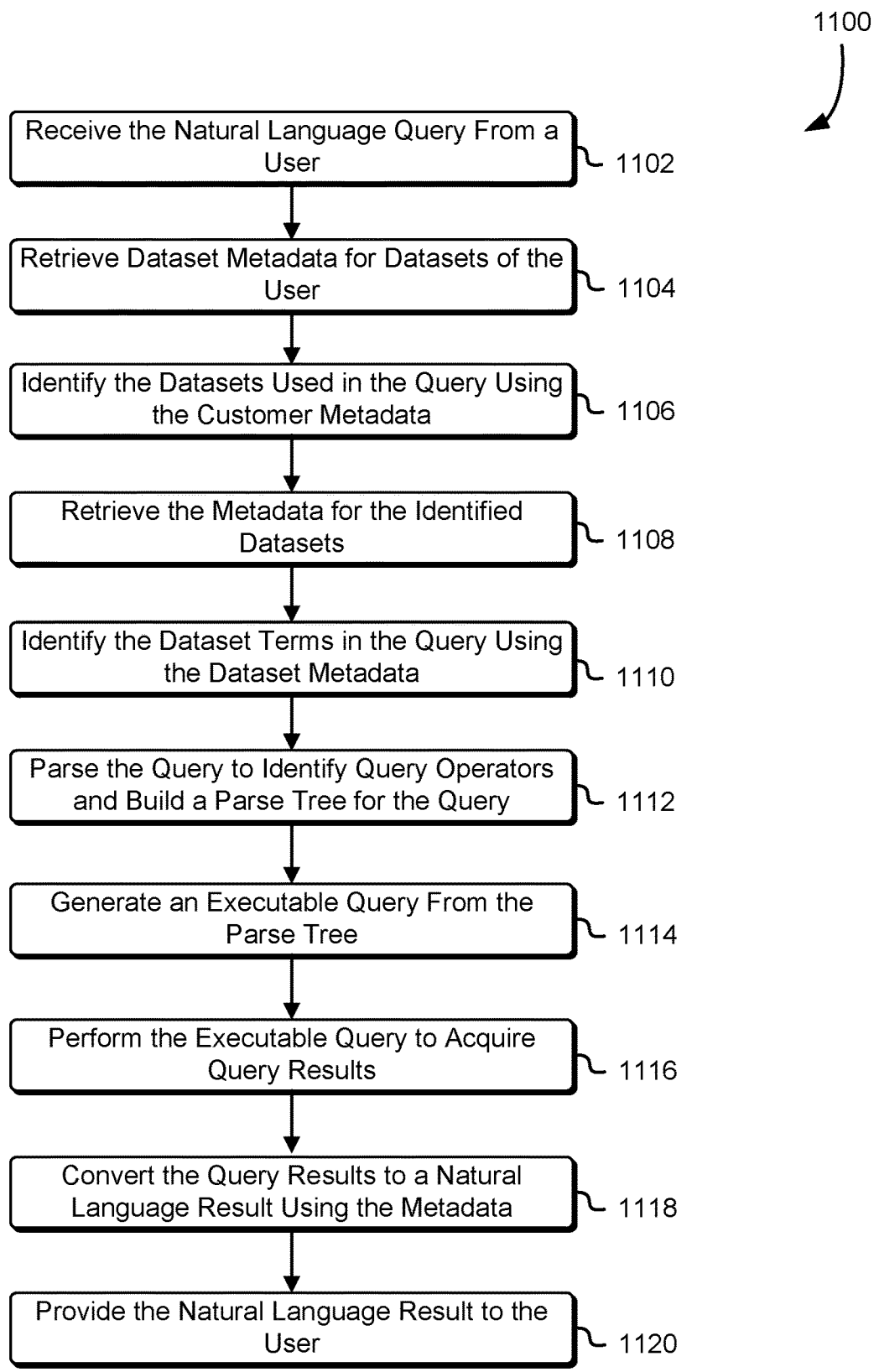
FIG. 11 shows an illustrative example of a data analysis system with active listening in accordance with one embodiment.

FIG. 11 shows an illustrative example of a process in accordance with one embodiment. In an embodiment, a flowchart 1100 illustrates a process that, as a result of being performed by a data analysis system, converts a natural language query into an executable query that can be performed by the data analysis system. In an embodiment, at block 1102, the data analysis system receives a natural language query from a user via a client computer system. In an embodiment, the user recites a natural language query which is captured by a microphone on the client computer system. In an embodiment, the client computer system digitizes the audio signal from the microphone into a data stream. In an embodiment, the natural language query is received in the form of an audio stream, and converted by the data analysis system into a sequence of tokens that represent natural language words. In an embodiment, the client computer system converts the data stream into a sequence of tokens, and the sequence of tokens is transmitted to the data analysis system.

In an embodiment, at block 1104, the data analysis system identifies data sets that are associated with the user. In an embodiment, the data analysis system acquires metadata for the data sets. In an embodiment, the metadata describes the names of the data sets, data columns of data sets, and data fields of the data sets. In an embodiment, at block 1106, the data analysis system iterates over each term in the natural language query and attempts to locate metadata that matches the term in order to identify data sets referenced in the query. In an embodiment, if the data analysis system is unable to find a match in the metadata that identifies a particular data set, the data analysis system attempts to identify the data set applicable to the query by finding data fields that are referenced in the natural language query. In an embodiment, the data analysis system identifies the data fields referenced in the natural language query, and finds a particular data set that contains the referenced fields. In an embodiment, at block 1108, the data analysis system retrieves metadata for each of the identified data sets that are used in the query. In an embodiment, the data set metadata identifies the data fields or column names used in each data set. In an embodiment, at block 1110, the data analysis system links terms in the natural language query to data fields or data columns in the data sets finding a best fit match between the names of the data columns or data fields and the terms used in the natural language query.

In an embodiment, at block 1112, the data analysis system parses the natural language query in accordance with a set of language rules and the metadata to generate a parse tree. In an embodiment, the set of language rules is a set of rules that describes the structured query language. In an embodiment, the set of language rules is a set of rules that describes a query language or a data manipulation language. In an embodiment, a query language describes a language that produces a data-based answer to the query. In an embodiment, a data manipulation language is a language that searches a library to identify matching documents. In an embodiment, the data analysis system produces a parse tree from the natural language query. In an embodiment the parse tree includes operation nodes and data nodes. In an embodiment, the parse tree is executed from a root node of the parse tree by walking the tree and performing each operation indicated by the node being traversed.

In an embodiment, at block 1114, the data analysis system generates an executable query by walking the parse tree and generating executable instructions that describe the operation indicated by each node of the parse tree. In an embodiment, at block 1116, the data analysis system executes the executable query to produce a set of query results. In an embodiment, as an alternative to producing an executable query, the data analysis system interprets the parse tree directly and execute the operations as the individual nodes of the parse tree are traversed. In an embodiment, at block 1118, the data analysis system converts the query results into a natural language format by applying the metadata. In an embodiment, the data analysis system identifies the names, datatypes, and relationships in the query in order to generate a natural language description of the query results.

In an embodiment, at block 1120, the data analysis system provides the natural language result to the user. In an embodiment, the data analysis system converts the natural language result into an audio stream, and other plays the audio stream for the user, or sends the audio stream to a client computer system which plays the audio stream for the user. In an embodiment, the data analysis system sends the natural language result to the client computer system, the client computer system converts the natural language result into an audio stream, and plays the audio stream for the user. In an embodiment, the data analysis system provides the natural language result to the client computer system, and the client computer system translates the natural language result into a localized language such as English, Spanish, French, or German. In an embodiment, after converting the natural language result into a localized language, the client computer system generates an audio stream of the converted natural language result which is played to the user.

Figure 12:
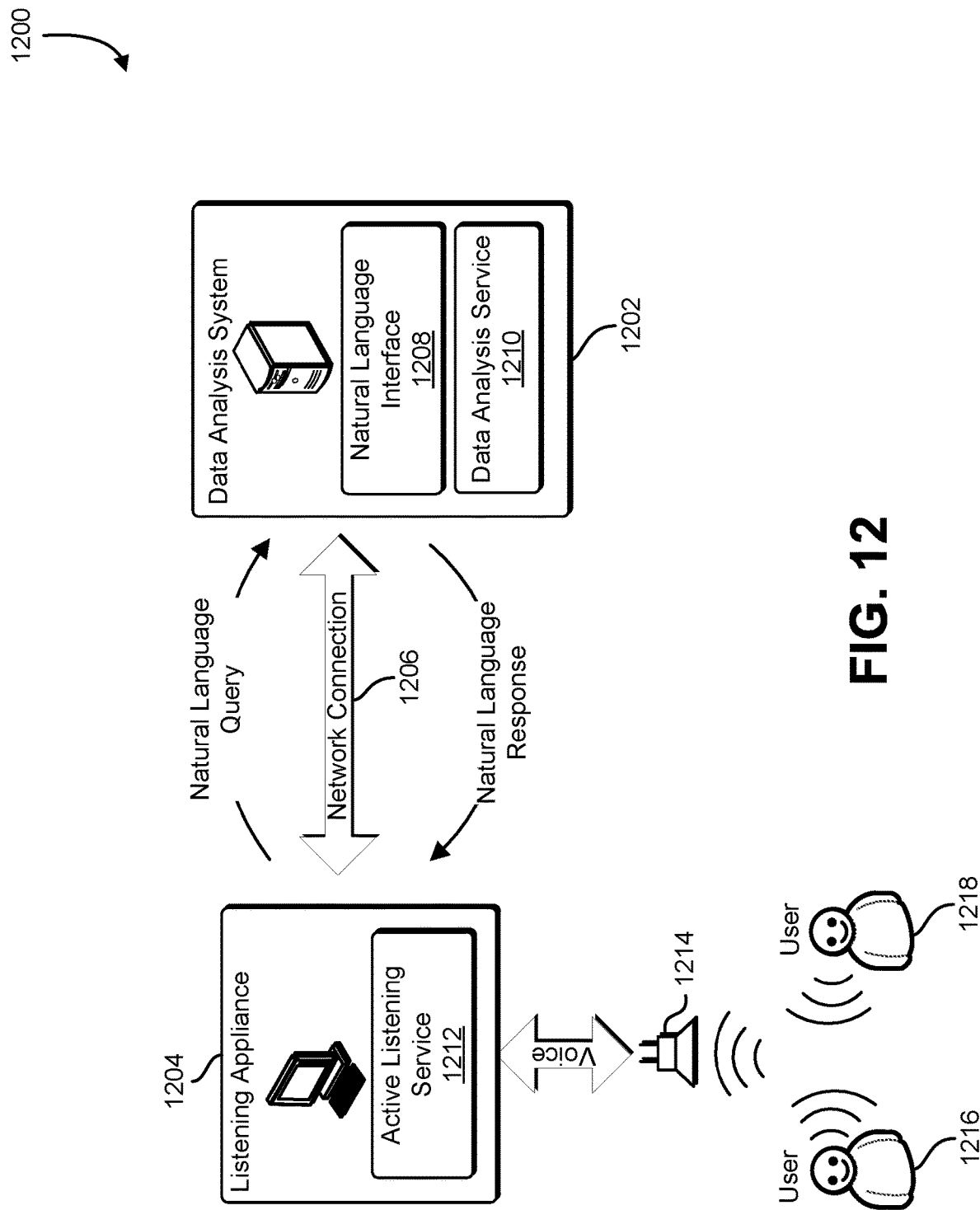
FIG. 12 shows an illustrative example of a process in accordance with one embodiment.

FIG. 12 shows an illustrative example of a data analysis system with active listening in accordance with one embodiment. In an embodiment, a system diagram 1200 illustrates a data analysis system 1202 with a natural language interface that supports active listening. In an embodiment, a system includes a data analysis system 1202 that communicates with a listening appliance 1204 by a network connection 1206. In an embodiment, the data analysis system is a computer system, server computer system, server cluster, virtual computer system, or computing service that hosts a natural language interface 1208 and a data analysis service 1210. In an embodiment, the natural language interface 1208 and the data analysis service 1210 are comprised of executable instructions stored in a memory on the data analysis system 1202. In an embodiment, the executable instructions are executed by a processor of the data analysis system 1202 and cause the data analysis system 1202 to perform various functions associated with the natural language interface 1208 and the data analysis service 1210.

In an embodiment, the data analysis service 1210 analyzes data sets that are submitted by users and identifies a set of insights for each data set. In an embodiment, as part of the analysis, the data analysis service 1210 collects metadata for each data set and each insight produced. In an embodiment, the metadata allows the data analysis service 1210 to associate a natural language name with individual data sets, individual data fields, and insights. In an embodiment, the natural language interface 1208 provides a way for users to interact with the data analysis system using natural language. In an embodiment, the natural language interface is an audio interface. In an embodiment, the natural language interface is a text interface. In an embodiment, the natural language interface 1208 exchanges audio streams with the listening appliance 1204. In an embodiment, the natural language interface 1208 exchanges streams of tokens representing natural language words with the listening appliance 1204.

In an embodiment, the network connection 1206 is a wired network connection, a wireless network connection, a fiber-optic network connection, or an infrared network connection. In an embodiment, the data analysis system 1202 and the listening appliance 1204 are integrated into a device and communicate via a backplane. In an embodiment, the listening appliance 1204 hosts an active listening service 1212. In an embodiment, the listening appliance 1204 includes an audio interface 1214. In an embodiment, the audio interface is a speaker and a microphone. In an embodiment, a first user 1216 and a second user 1218 engage in a conversation with each other in the presence of the audio interface 1214. In an embodiment, the active listening service 1212 monitors the conversation using the audio interface 1214 and acquires an audio stream. In an embodiment, the active listening service 1212 identifies the identities of the first user 1216 and the second user 1218 using voice recognition. In an embodiment, the active listening service detects the location of the parties to the conversation, and uses the location of the conversation as an aid to help identify the data being discussed. In an embodiment, the active listening service 1212 converts the audio stream to a sequence of tokenized words using speech recognition and assigns the individual words to the particular user that spoke the words. In an embodiment, the sequence of tokenized words represents a natural language conversation. In an embodiment, the listening appliance 1204 sends the natural language conversation to the data analysis system 1202.

In an embodiment, the natural language interface 1208 identifies the data sets that are associated with the participants in the conversation. In an embodiment, the natural language interface retrieves the metadata for the identified data sets, and uses the metadata to match terms in the natural language conversation with data sets, data columns, and insights that are associated with the data sets. In an embodiment, the natural language interface develops a relevant score for each identified insight, and if an individual insight has a score greater than a threshold value, the natural language interface 1208 generates a natural language response based on the insight and sends the natural language response to the active listening service 1212. In an embodiment, the active listing service receives the natural language response and converts the natural language response to an audio stream. In an embodiment, the audio stream is sent to the audio interface 1214 and played to the first user and the second user 1218. In this way, the active listening service 1212 monitors the conversation between the participants of the conversation, and is able to interject relative insights into the conversation in real time.

Figure 13:
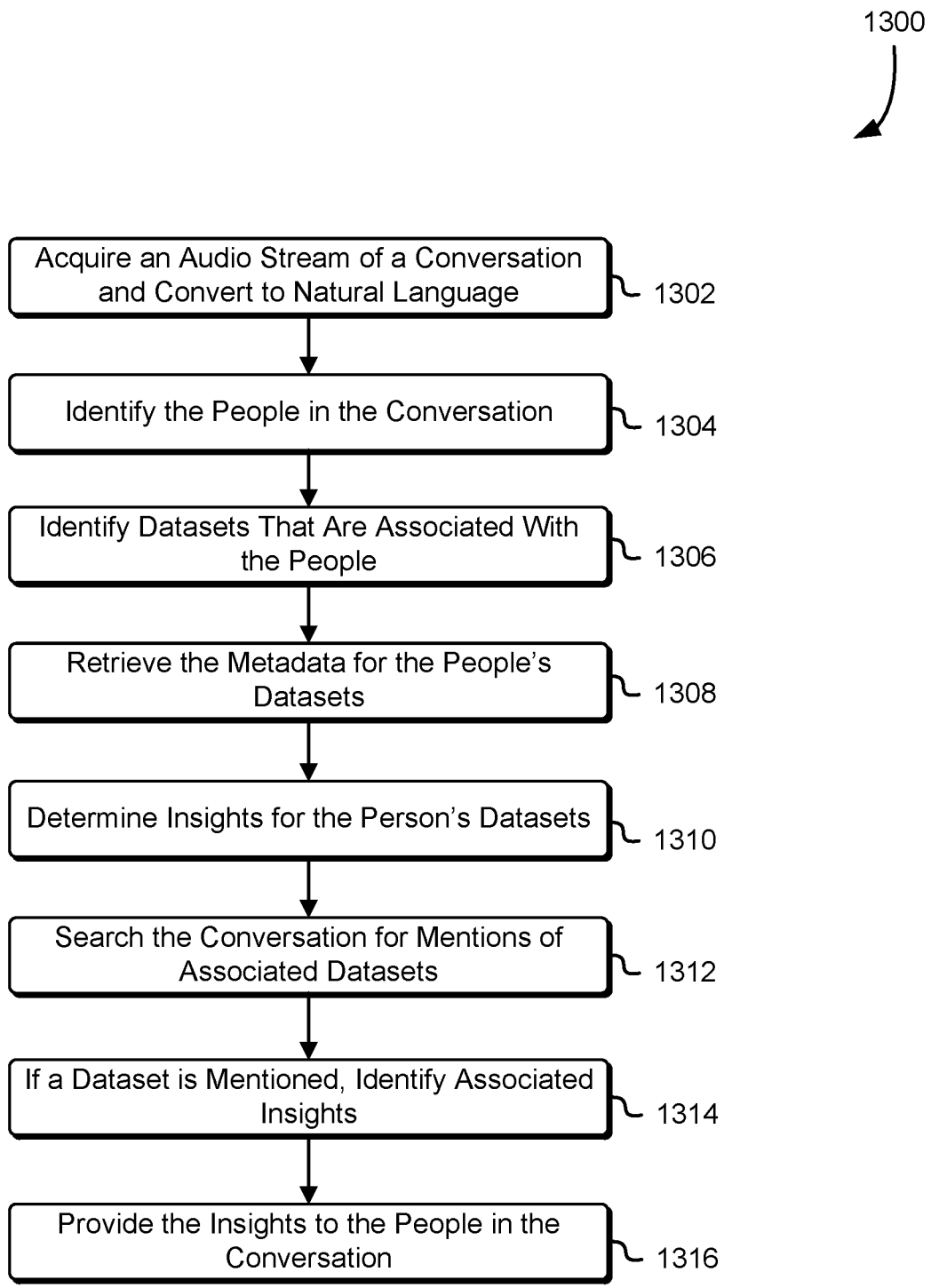
FIG. 13 shows an illustrative example of a process in accordance with one embodiment.

FIG. 13 shows an illustrative example of a process in accordance with one embodiment. In an embodiment, a flowchart 1300 illustrates a process that, as a result of being performed by a data analysis system, produces insights in real-time by processing an audio stream of a conversation. In an embodiment, the process begins at block 1302 with the data analysis system acquiring a sequence of natural language words that represent a conversation. In an embodiment, the data analysis system acquires an audio stream from a listening appliance, and converts the audio stream to a sequence of natural language words using speech recognition. In an embodiment, the data analysis system identifies 1304 the people participating in the conversation. In an embodiment, the listening appliance identifies the people in the conversation and provides the identities to the data analysis system. In an embodiment, the data analysis system receives an audio stream and the data analysis system identifies the participants in the conversation using speech recognition. In an embodiment, at block 1306, the data analysis system identifies data sets that are associated with the participants to the conversation. In an embodiment, the data analysis system identifies data sets that are available to the participants to the conversation such as publicly available data sets and data sets to which the participants have been granted access.

In an embodiment, at block 1308, the data analysis system retrieves metadata for the participants' data sets. In an embodiment, the metadata includes names for the data sets, names for the columns of data sets, and names for the data fields of the data sets. In an embodiment, at block 1310, the data analysis system generates insights for each of the identified data sets. In an embodiment the insights include minimums, maximums, trends, correlations between identified data sets, or other characteristics. In an embodiment, at block 1312, the data analysis system searches the conversation for mentions of data sets, data fields, or data columns that are associated with the participants of the conversation. In an embodiment, at block 1314, the data analysis system searches the generated insights to identify links between the mentioned data sets, data fields, and data columns and the insights. In an embodiment, if the link is found between a particular insight and elements that are mentioned in the conversation, the data analysis system determines whether to interject the insight into the conversation.

In an embodiment, the data analysis system at block 1316 develops a score for the identified insight. In an embodiment, the score is based at least in part on a base score for the insight. In an embodiment, the base score is based at least in part on the type of the insight, and a level of confidence produced by the insight-generation algorithm. In an embodiment, the participants to the conversation indicate to the data analysis system a level of interaction for the data analysis system. In an embodiment, if the identified insight has a score that exceeds the identified level of interaction, then the data analysis system determines that the insight should be interjected into the conversation. In an embodiment, the data analysis system interjects the insight into the conversation by converting the insight into a natural language stream, converting the natural language stream into an audio stream, and playing the audio stream to the participants of the conversation. In an embodiment, the data analysis system provides a visual indication to the participants indicating that a relevant insight has been detected. In an embodiment, the participants indicate by spoken words or by manipulating user interface that they wish the data analysis system to provide the detected insight.

Figure 14:
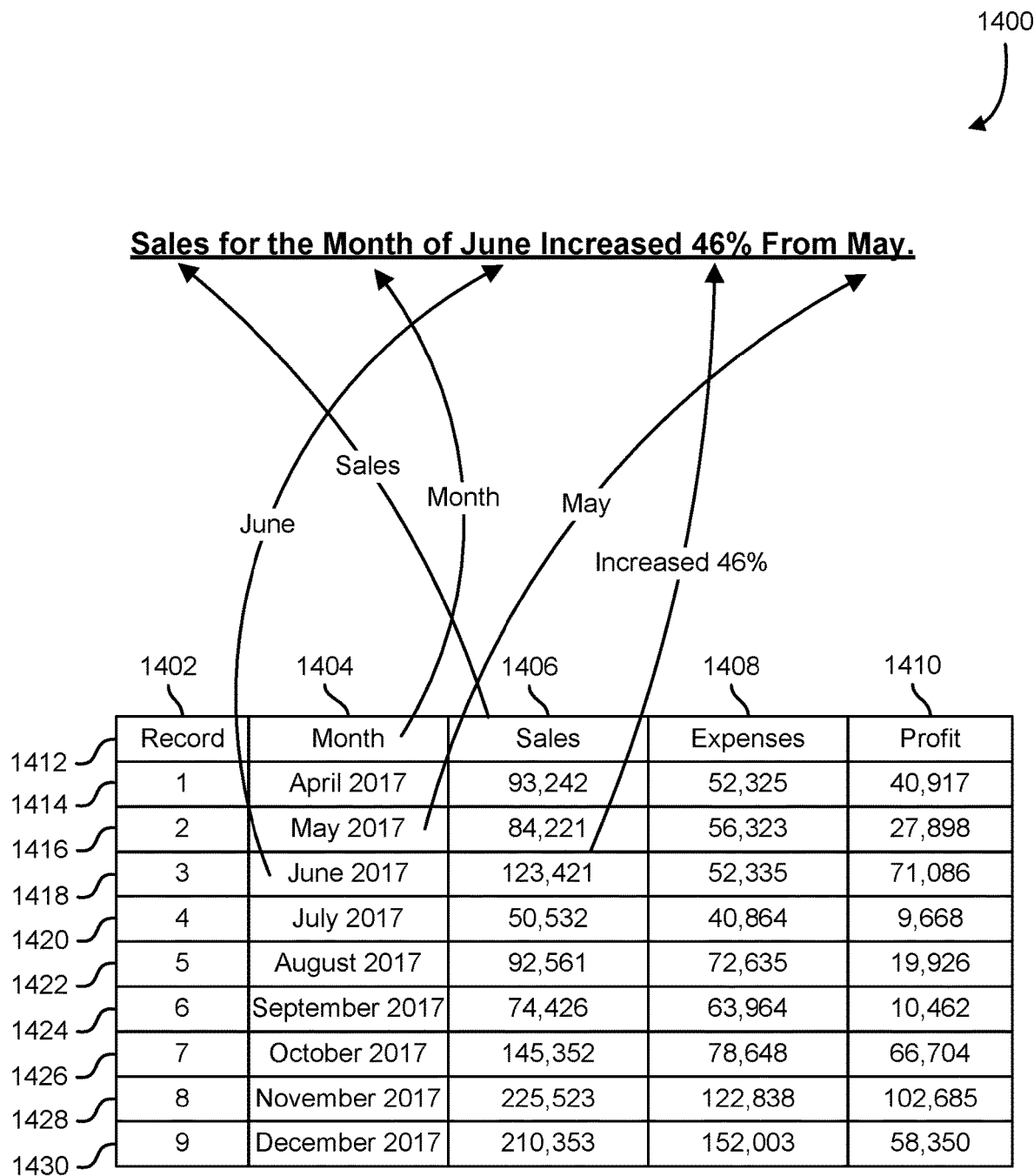
FIG. 14 shows an illustrative example of a natural language insight in accordance with one embodiment.

FIG. 14 shows an illustrative example of a natural language insight in accordance with one embodiment. In an embodiment, a diagram 1400 illustrates the generation of a natural language insight using associated metadata extracted by a data analysis system. In an embodiment, the user data set includes a record column 1402, a month column 1404, a sales column 1406, and expenses column 1408, and a profit column 1410. In an embodiment, the record column 1402 includes an integer index for each record. In an embodiment, the month column 1404 specifies a particular month for each data record. In an embodiment, the sales column 1406 holds an amount of gross sales, denominated in a currency, for the associated month. In an embodiment, the expenses column 1408 holds an amount of expenses for the associated month, denominated in a currency. In an embodiment, the profit column 1410 is a summary column that holds the difference between revenue and expenses for the month.

In an embodiment, the user data set holds a set of records. In an embodiment a heading record 1412 holds a natural language description of each column. In an embodiment, the user data set includes a collection of data records 1414, 1416, 1418, 1420, 1422, 1424, 1426, 1428, and 1430. In an embodiment, each individual data record in the collection of data records holds a set of values.

In an embodiment, the data analysis system extracts various metadata from the user data set to produce a natural language insight into the data set. In the embodiment illustrated in FIG. 14, the data and analysis system analyzes the data set and identifies an insight in the sales data for the month of June that indicates a 46% increase in sales from the previous month. In an embodiment, to present the insight to the user, the data analysis system converts the insight into a natural language format using metadata extracted from the data set. In an embodiment, the data analysis system determines a description for the data by examining the heading record 1412. In an embodiment, the heading record 1412 indicates that the sales column 1406 has a description of "Sales." In an embodiment, the data analysis system examines the data set to identify a time period or record index associated with the spike in sales. In an embodiment, the data analysis system identifies the record column 1402 and the month column 1404 as possible associated indexes. In an embodiment, the data analysis system prefers date columns over record numbers and selects the month column 1404 as the associated index for the sales data. In an example, the data analysis system examines the heading record 1412 for the month column 1404 and identifies a name for the index of "Month."

In an embodiment, the data analysis system pulls index data from the index column to identify the particular sales data associated with the insight. In an embodiment, the data analysis system identifies the third data record 1418 and the second data record 1416 as the relative data records for the insight. In an embodiment, the data analysis system uses the name of the month for the third data record 1418 and the second data record 1416 to identify the data in the natural language version of the insight. In an embodiment, data analysis system a natural language version of the insight "increased 46%" with the metadata extracted from the data set to produce a natural language insight "sales for the month of June increased 46% from May." In an embodiment, the natural language insight is presented to the user in the form of text on a display screen. In an embodiment, the natural language insight is converted into an audio representation of spoken words, and the audio representation is played for the user.

Figure 15:
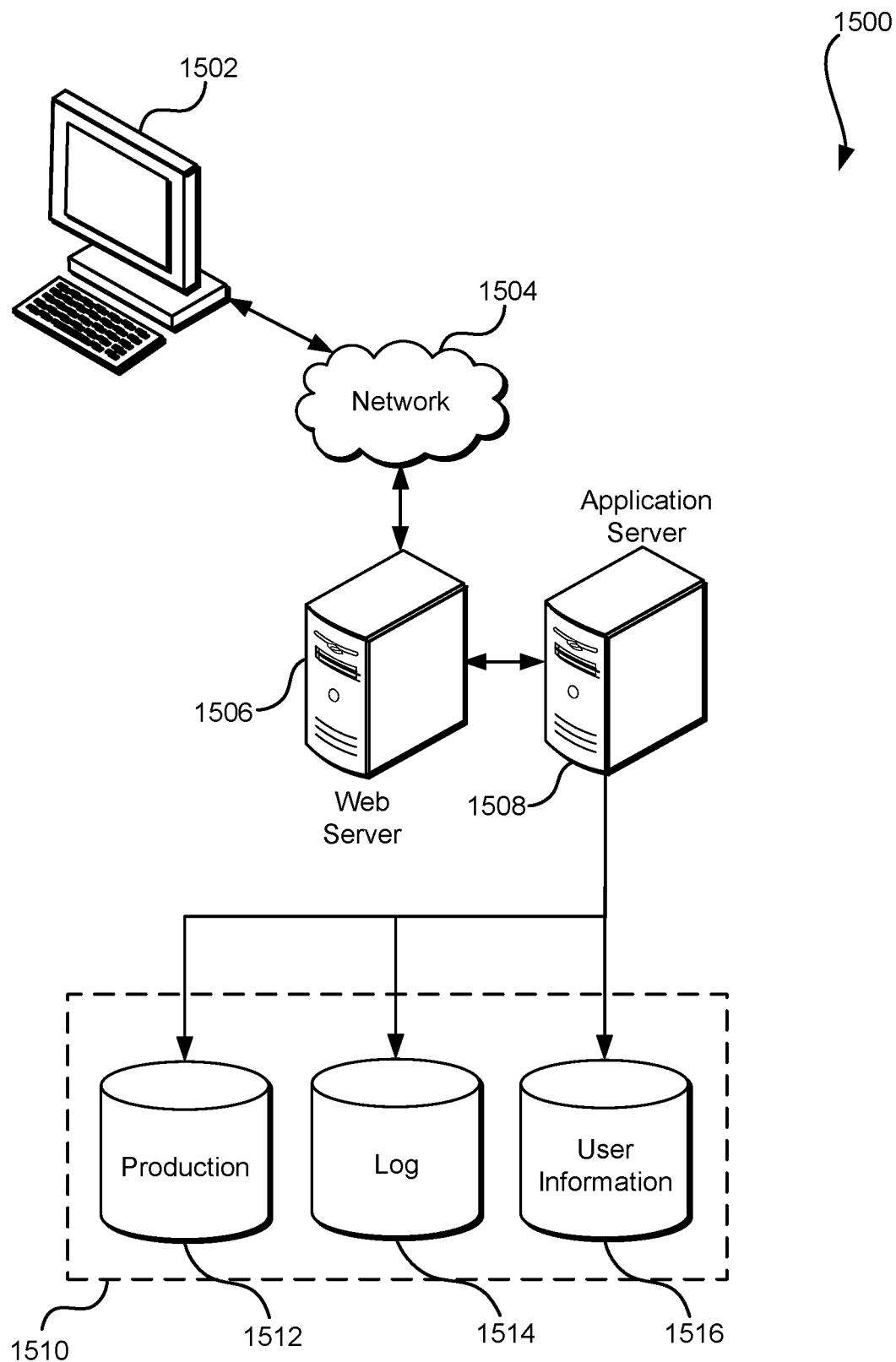
FIG. 15 illustrates an illustrative example of a system in which various embodiments can be implemented.

FIG. 15 illustrates a system 1500 for implementing aspects in accordance with one embodiment. In an embodiment, a web-based system is used. The system includes an electronic client device 1502, which can include any appropriate device operable to send and/or receive requests, messages, or information over an appropriate network 1504 and, in an embodiment, convey information back to a user of the device. In an embodiment, client devices include personal computers, cell phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network, and/or combination thereof. In an embodiment, components used for such a system can depend at least in part on the type of network and/or system selected. In an embodiment, communication over the network can be enabled by wired or wireless connections and combinations thereof. In an embodiment, the network includes the Internet and/or publicly addressable communications network, as the system includes a web server 1506 for receiving requests and serving content in response thereto. In an embodiment, an alternative device serving a similar purpose is used for other networks.

In an embodiment, the illustrative system includes at least one application server 1508 and a data store 1510. In an embodiment, there are several application servers, layers, or other elements, processes, or components, which are chained or otherwise configured, which can interact to perform tasks such as obtaining data from an appropriate data store. Servers, as used herein, can be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. In an embodiment, the application server can include any appropriate hardware, software, and firmware that integrates with the data store as needed to execute aspects of one or more applications for the client device, handling some or all of the data access and business logic for an application. In an embodiment, the application server provides access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In an embodiment, content transferred to a client device is processed by the client device to provide the content in one or more forms including, but not limited to, forms that are perceptible to the user audibly, visually, and/or through other senses. In an embodiment, the handling of requests and responses, and the delivery of content between the client device 1502 and the application server 1508, is handled by the web server using PHP: Hypertext Preprocessor ("PHP"), Python, Ruby, Perl, Java, HTML, XML, JSON, and/or another appropriate server-side structured language. Further, operations described herein as being performed by a single device may, unless otherwise clear from context, be performed collectively by multiple devices, which may form a distributed and/or virtual system.

In an embodiment, the data store 1510 includes several separate data tables, databases, data documents, dynamic data storage schemes, and/or other data storage mechanisms and media for storing data relating to a particular aspect of the present disclosure. In an embodiment, the data store illustrated includes mechanisms for storing production data 1512 and user information 1516, which can be used to serve content for the production side. In an embodiment, the data store is shown to include a mechanism for storing log data 1514, which can be used for reporting, analysis, or other such purposes. In an embodiment, other aspects are stored in the data store, such as page image information and access rights information, which can be stored in any of the above listed mechanisms as appropriate or in additional mechanisms in the data store 1510. In an embodiment, the data store 1510 is operable, through logic associated therewith, to receive instructions from the application server 1508 and obtain, update, or otherwise process data in response thereto. In an embodiment, the application server 1508 provides static, dynamic, or a combination of static and dynamic data in response to the received instructions. In an embodiment, dynamic data, such as data used in web logs (blogs), shopping applications, news services, and other such applications is generated by server-side structured languages as described herein or may be provided by a content management system ("CMS") operating on, or under the control of, the application server. In an embodiment, a user, through a device operated by the user, submits a search request for a certain type of item, and the data store accesses the user information to verify the identity of the user and can access the catalog detail information to obtain information about items of that type, and then the information is returned to the user. In an embodiment, the information is returned as a results listing on a web page that the user is able to view via a browser on the client device 1502. In an embodiment, information for a particular item of interest is viewed in a dedicated page or window of the browser. The present disclosure is not limited to the context of web pages, and may be applicable to processing requests in general where the requests are not requests for content.

In an embodiment, a server includes an operating system that provides executable program instructions for the general administration and operation of that server and further includes a computer-readable storage medium (e.g., a hard disk, random access memory, read only memory, etc.) storing instructions that, when executed (i.e., as a result of being executed) by a processor of the server, allow the server to perform its intended functions.

The system, in an embodiment, is a distributed and/or virtual computing system utilizing several computer systems and components that are interconnected via communication links, using one or more computer networks or direct connections. In an embodiment, such a system could have a fewer or a greater number of components than are illustrated in FIG. 15. Thus, the depiction of the system 1500 in FIG. 15 should be taken as being illustrative in nature and not limiting to the scope of the disclosure.

An embodiment can be implemented in a wide variety of systems, which in some cases can include one or more user computers, computing devices, or processing devices, which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. An embodiment can also include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual computer system, hypervisors, and other virtual devices capable of communicating via a network.

An embodiment can utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In an embodiment, connection-oriented protocols may be used to communicate between network endpoints. Connection-oriented protocols (sometimes called connection-based protocols) are capable of transmitting data in an ordered stream. Connection-oriented protocols can be reliable or unreliable. In an embodiment, the protocol is a reliable connection-oriented protocol such as TCP. In an embodiment, the protocol is an unreliable connection-oriented protocol such as Asynchronous Transfer Mode ("ATM") or Frame Relay. Connection-oriented protocols are in contrast to packet-oriented protocols such as UDP that transmit packets without a guaranteed ordering.

In an embodiment that utilizes a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the server(s) are capable of executing programs or scripts in response to requests from user devices, such as by executing one or more web applications that may be implemented as one or more scripts or programs written in any programming language, such as Java®, C, C#, or C++, or any scripting language, such as Ruby, personal home page ("PHP"), Perl, Python, or test control language ("TCL"), as well as combinations thereof. In an embodiment, the server(s) include one or more database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. In an embodiment, these reside in a variety of locations, such as on a storage medium local to (and/or resident in) one or more of the computers or remote from any or all of the computers across the network. In an embodiment, the information may reside in a storage-area network ("SAN") familiar to those skilled in the art. In an embodiment, files for performing the functions attributed to the computers, servers or other network devices may be stored locally and/or remotely, as appropriate. In an embodiment where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device.

In an embodiment, a service may be implemented using a serverless computing architecture. In an embodiment, a serverless computing service is a service that allows users to submit requests for program execution to the service without being assigned a particular computing resource. In an embodiment, requests for execution on a serverless computing service are stateless from the standpoint of the service, and any program state is passed in with the request. In an embodiment, the host entity for the serverless computing service designates physical computing resources on demand, and may one or more computer systems as needed based on transient demand. In an embodiment, serverless computing services improve the scalability of the system by allowing requests to be fulfilled using a variety of physical processing resources under the control of the serverless computing service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    obtaining, at a computer system, a dataset associated with a customer, and metadata of the dataset, provided with the dataset, wherein the metadata comprises descriptive information for at least some data of the dataset, at least a portion of the descriptive information corresponding to structured data comprised in the dataset;
    analyzing, using a processor of the computer system, the dataset to identify a set of characteristics of the dataset, the set of characteristics comprising statistical values calculated based at least in part on the dataset;
    selecting a subset of the characteristics based at least in part on at least one score associated with the set of characteristics, the at least one score determined at least based on at least one user preference associated with the customer and at least a portion of the metadata; and
    presenting the subset of the characteristics to the customer with a visualization of the dataset.

2. The method of claim 1, wherein:
    the metadata associated with the dataset includes a natural language name for a data element of the dataset; and
    the subset of the characteristics are presented to the customer in a natural language format.

3. The method of claim 1, wherein the set of characteristics includes a relationship with another dataset, an outlier data element in the dataset, or a data trend of the dataset.

4. The method of claim 1, further comprising:
    determining a base score for each characteristic in the set of characteristics, the base score based at least in part on a type of each characteristic; and
    producing the at least one score for each characteristic based at least in part on the base score of each characteristic and the at least one user preference, the at least one user preference related to each characteristic.

5. The method of claim 1, wherein the descriptive information corresponding to the structured data comprised in the dataset identifies at least a portion of a formatting for the structured data.

6. A system comprising:
one or more processors; and
a memory storing instructions that, as a result of being executed by the one or more processors, cause the system to:
obtain a dataset;
analyze the dataset to identify a set of characteristics of the dataset;
select a subset of the characteristics based at least in part on at least one score associated with the set of characteristics, the at least one score determined at least based on at least one user preference and at least a portion of metadata, wherein the metadata is provided with the dataset and the metadata comprises descriptive information for at least some data of the dataset; and
provide the subset of the characteristics to the user.

7. The system of claim 6, wherein:
the dataset is data provided by the user; and
the system provides the subset of the characteristics to the user.

8. The system of claim 7, wherein the instructions, as a result of being executed by the one or more processors, further cause the system to provide the subset of the characteristics to the user by at least:
generating a hypertext markup language web page that describes the subset of the characteristics;
sending the hypertext markup language web page to a client computer system; and
causing the client computer system to display the hypertext markup language web page in a web browser.

9. The system of claim 6, wherein the instructions, as a result of being executed by the one or more processors, further cause the system to:
determine a base score for each characteristic in the set of characteristics, the base score based at least in part on a type of each characteristic, the base score for at least one of the characteristics in the set of characteristics associated with the at least one score.

10. The system of claim 9, wherein the instructions, as a result of being executed by the one or more processors, further cause the system to:
acquire preferences of the user for the set of characteristics;
determine an adjusted score for each characteristic based at least in part on the preferences; and
select the subset of the characteristics from the set of characteristics based at least in part on at least one of the adjusted scores, wherein the at least one of the adjusted scores comprises the at least one score.

11. The system of claim 6, wherein the instructions, as a result of being executed by the one or more processors, further cause the system to acquire the metadata by at least:
determining the metadata based at least in part on a name of the dataset; and
determining the metadata based at least in part on a name of a data field of the dataset.

12. The system of claim 6, wherein the subset of the characteristics that are provided to the user include a characteristic of the dataset presented in the form of a natural language insight describing the dataset.

13. The system of claim 6, wherein the subset of the characteristics that are provided to the user include a relationship with another dataset.

14. The system of claim 6, wherein the descriptive information identifies at least a portion of a formatting for the data of the dataset.

15. A non-transitory computer-readable storage medium with executable instructions stored thereon that, as a result of being executed by one or more processors of a computer system, cause the computer system to at least:
obtain a dataset;
analyze the dataset to identify a set of characteristics of the dataset;
select a subset of the characteristics based at least in part on at least one score associated with the set of characteristics, the at least one score determined at least based on at least one user preference associated with the customer and at least a portion of metadata, wherein the metadata is provided with the dataset and the metadata comprises descriptive information for the dataset; and
provide the subset of the characteristics to the user.

16. The non-transitory computer-readable storage medium of claim 15, wherein:
the dataset is data uploaded by the user to the computer system from a client computer system via a computer network; and
the system provides the subset of the characteristics to the user.

17. The non-transitory computer-readable storage medium of claim 15, wherein the instructions further comprise instructions that, as a result of being executed by the one or more processors, cause the computer system to:
identify a name for each data field in the dataset;
identify a data type for each data field of the dataset;
generate a score for each characteristic of the dataset based at least in part on the name and the type of each data field associated with each characteristic, at least one of the generated scores comprising the at least one score; and
select the subset of the characteristics based at least in part on the score of each characteristic.

18. The non-transitory computer-readable storage medium of claim 15, wherein the instructions further comprise instructions that, as a result of being executed by the one or more processors, cause the computer system to:
determine a level of confidence for each characteristic in the set of characteristics; and
select the subset of the characteristics based at least in part on the level of confidence of each characteristic.

19. The non-transitory computer-readable storage medium of claim 18, wherein:
the subset of the characteristics includes a characteristic that identifies an outlier of the dataset; and
the level of confidence for the characteristic that identifies the outlier is a value related to the degree of the outlier.

20. The non-transitory computer-readable storage medium of claim 18, wherein:
the subset of the characteristics includes a characteristic that identifies a relationship with another dataset; and
the level of confidence for the characteristic that identifies a relationship is a value related to the degree of the relationship between the dataset and the other dataset.

21. The non-transitory computer-readable storage medium of claim 20, wherein the relationship to the other dataset is a correlation with the other dataset or a period-over-period comparison with the other dataset.

22. The non-transitory computer-readable storage medium of claim 15, wherein the instructions further comprise instructions that, as a result of being executed by the one or more processors, cause the computer system to:
    generate a document that describes the subset of the characteristics; and
    send the document to a client computer system.

23. The non-transitory computer-readable storage medium of claim 15, wherein the descriptive information identifies at least a portion of a formatting for the data of the dataset.

\* \* \* \* \*